United States Patent
Kim et al.

(10) Patent No.: US 11,792,393 B2
(45) Date of Patent: Oct. 17, 2023

(54) INTER PREDICTION ENCODING AND DECODING METHOD USING COMBINATION OF PREDICTION BLOCKS, AND COMPUTER-READABLE STORAGE MEDIUM BITSTREAM TO BE DECODED THEREBY

(71) Applicant: INTELLECTUAL DISCOVERY CO., LTD., Seoul (KR)

(72) Inventors: Jae Gon Kim, Goyang-si (KR); Do Hyeon Park, Goyang-si (KR); Yong Uk Yoon, Jeju-si (KR); Ji Hoon Do, Busan (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 17/418,643

(22) PCT Filed: Dec. 30, 2019

(86) PCT No.: PCT/KR2019/018741
§ 371 (c)(1),
(2) Date: Jun. 25, 2021

(87) PCT Pub. No.: WO2020/139061
PCT Pub. Date: Jul. 2, 2020

(65) Prior Publication Data
US 2022/0070448 A1  Mar. 3, 2022

(30) Foreign Application Priority Data

Dec. 28, 2018 (KR) .................. 10-2018-0172827

(51) Int. Cl.
*H04N 19/109* (2014.01)
*H04N 19/105* (2014.01)
(Continued)

(52) U.S. Cl.
CPC ......... *H04N 19/109* (2014.11); *H04N 19/105* (2014.11); *H04N 19/176* (2014.11); *H04N 19/51* (2014.11)

(58) Field of Classification Search
CPC .. H04N 19/105; H04N 19/109; H04N 19/119; H04N 19/176; H04N 19/51;
(Continued)

(56) References Cited

U.S. PATENT DOCUMENTS

2014/0161186 A1* 6/2014 Zhang .................. H04N 19/103
375/240.16
2015/0222898 A1 8/2015 Oh et al.
(Continued)

FOREIGN PATENT DOCUMENTS

CN   1984340 A   6/2007
CN   104956678 A   9/2015
(Continued)

OTHER PUBLICATIONS

International Search Report for PCT/KR2019/018741 dated Apr. 13, 2020 [PCT/ISA/210].
(Continued)

*Primary Examiner* — Jessica M Prince
(74) *Attorney, Agent, or Firm* — BROADVIEW IP LAW, PC

(57) ABSTRACT

An encoding/decoding method and device according to the present disclosure may: determine at least one among a plurality of inter prediction modes as the inter prediction mode of the current block; form an inter prediction candidate list on the basis of the determined inter prediction mode; perform motion compensation on the basis of one prediction candidate in the inter prediction candidate list,
(Continued)

and generate a first prediction block of the current block; and correct the first prediction block by using a prescribed intra prediction mode.

9 Claims, 17 Drawing Sheets

(51) Int. Cl.
*H04N 19/176* (2014.01)
*H04N 19/51* (2014.01)

(58) Field of Classification Search
CPC .... H04N 19/577; H04N 19/70; H04N 19/423; H04N 19/593
See application file for complete search history.

(56) References Cited

U.S. PATENT DOCUMENTS

| | | | |
|---|---|---|---|
| 2018/0376138 A1 | 12/2018 | Lee et al. | |
| 2018/0376148 A1 | 12/2018 | Zhang et al. | |
| 2020/0029073 A1* | 1/2020 | Chiang | H04N 19/52 |
| 2020/0120339 A1* | 4/2020 | Chiang | H04N 19/136 |
| 2020/0137398 A1* | 4/2020 | Zhao | H04N 19/159 |
| 2020/0221077 A1* | 7/2020 | Park | H04N 19/513 |
| 2021/0409723 A1* | 12/2021 | Lee | H04N 19/176 |

FOREIGN PATENT DOCUMENTS

| | | |
|---|---|---|
| CN | 107113425 A | 8/2017 |
| KR | 10-2018-0026718 A | 3/2018 |
| WO | 2016/195460 A1 | 12/2016 |
| WO | 2018/016823 A1 | 1/2018 |

OTHER PUBLICATIONS

Written Opinion for PCT/KR2019/018741 dated Apr. 13, 2020 [PCT/ISA/237].

Office Action for CN 201980091943.0 by China National Intellectual Property Administration dated May 29, 2023.

Chiang, Man-Shu et al. (2018) "CE10.1: Combined and multi-hypothesis prediction." JVET-K0257-v1. Joint Video Experts Team (JVET) of ITU-T SG 16 WP 3 and ISO/IEC JTC 1/SC 29/WG 11; 11th Meeting: Ljubljana, SI, Jul. 10-18, 2018.

* cited by examiner

FIG. 13
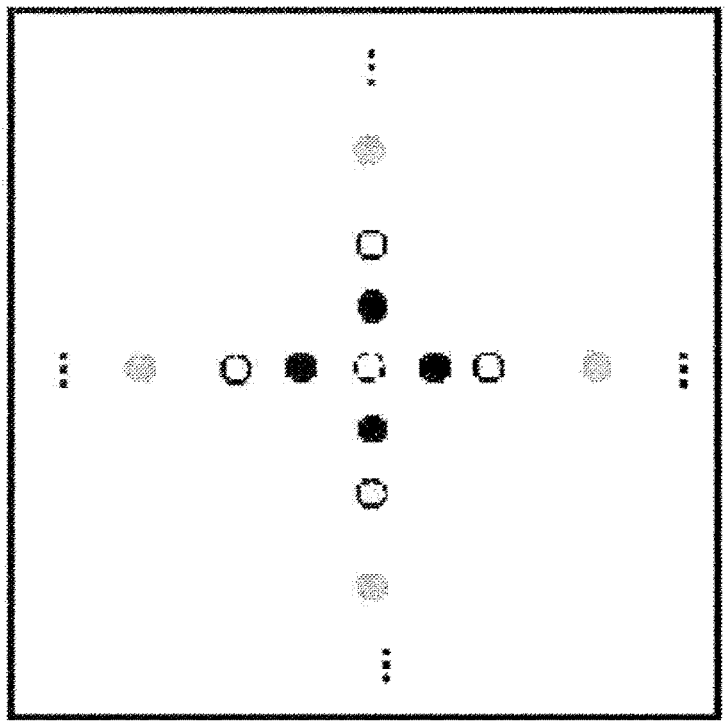
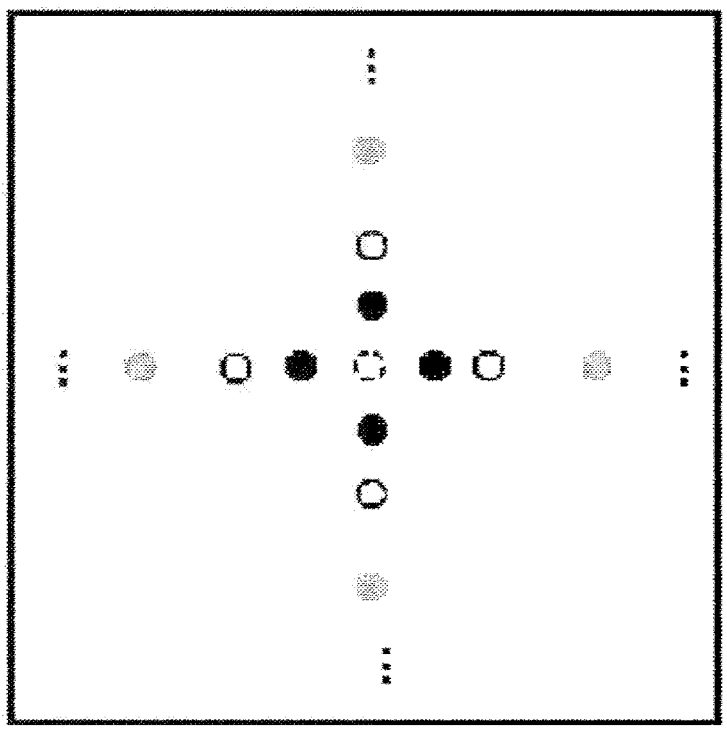

FIG. 15
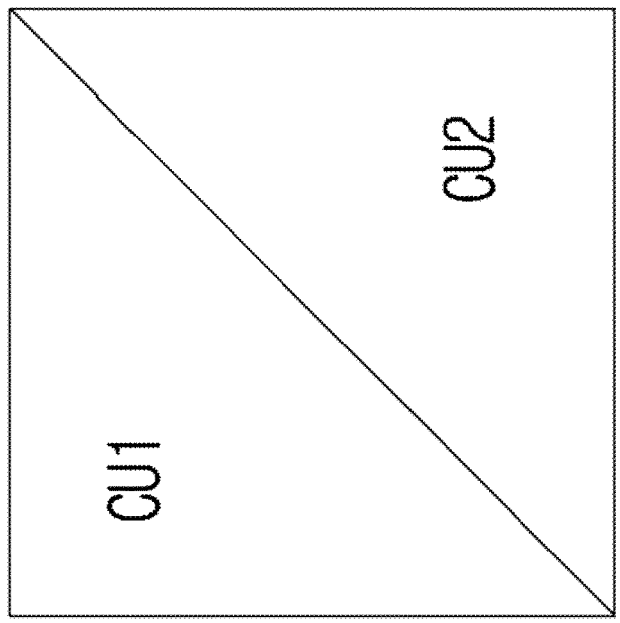
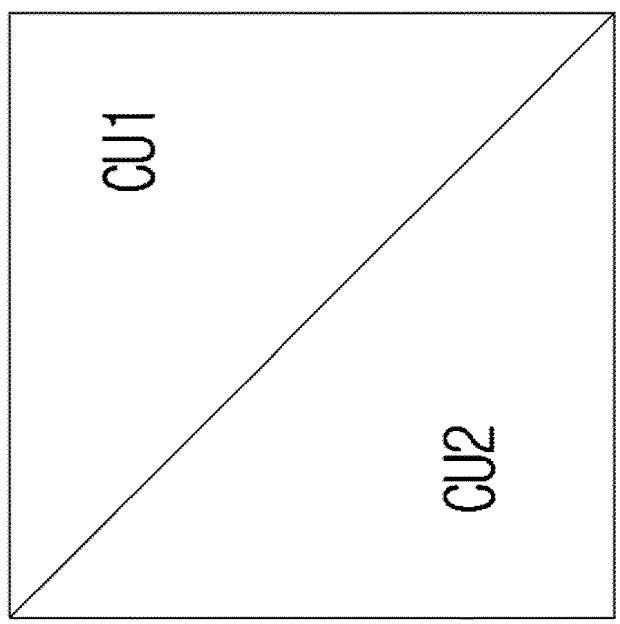

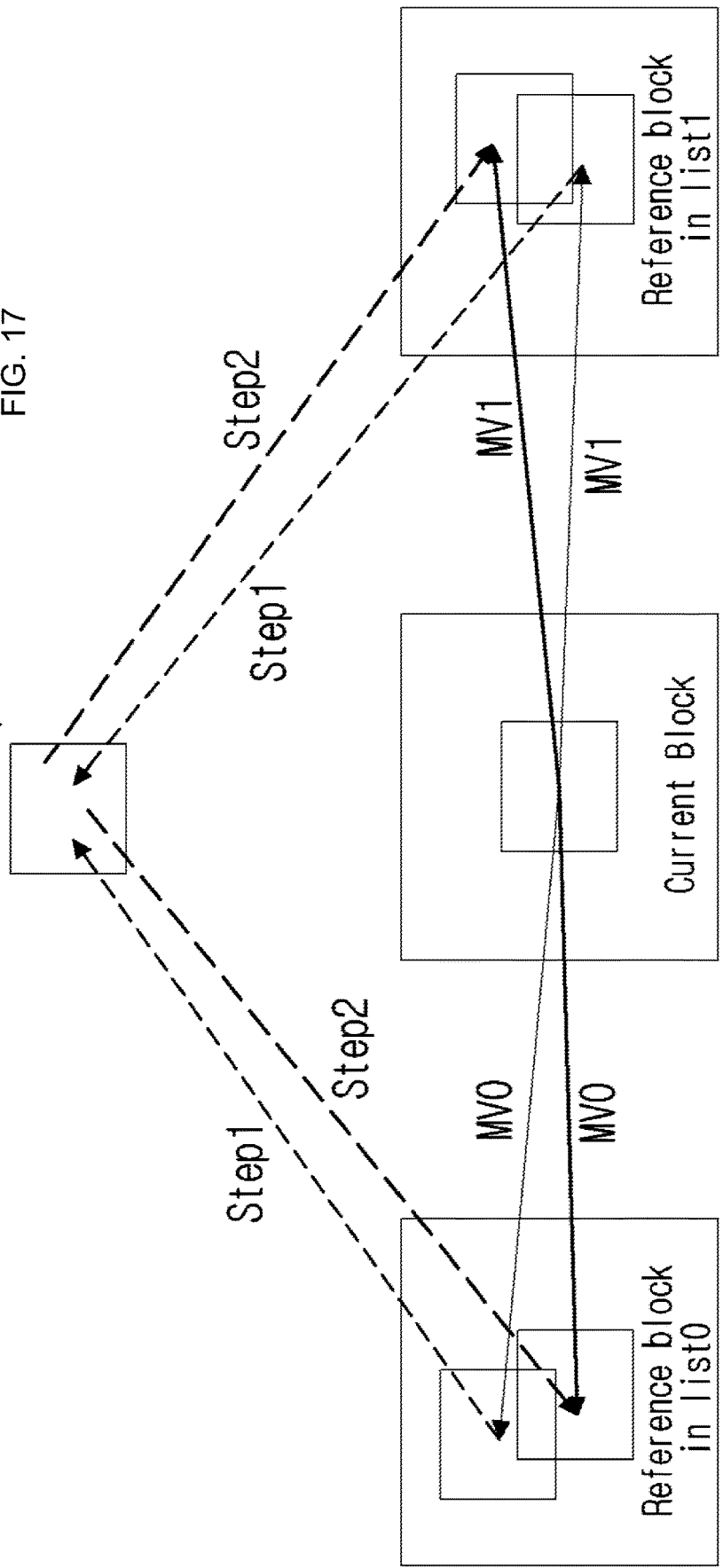

INTER PREDICTION ENCODING AND DECODING METHOD USING COMBINATION OF PREDICTION BLOCKS, AND COMPUTER-READABLE STORAGE MEDIUM BITSTREAM TO BE DECODED THEREBY

TECHNICAL FIELD

The present disclosure relates to an image encoding/decoding method and apparatus.

BACKGROUND ART

A video image is compression-encoded by removing spatial-temporal redundancy and inter-view redundancy, which may be transmitted through a communication line or stored in a format suitable for a storage medium.

The market demand for high-resolution video is increasing, and accordingly, there is a need for a technology capable of efficiently compressing high-resolution images. In accordance with these demands of the market, ISO/IEC's Moving Picture Expert Group (MPEG) and ITU-T's VCEG (Video Coding Expert Group) jointly formed JVET to actively study and develop the VVC (Versatile Video Coding) video compression standard.

Video compression is largely composed of intra prediction, inter prediction, transform, quantization, entropy coding, and in-loop filter. Meanwhile, as the demand for high-resolution images increases, the demand for 3D image contents as a new image service is also increasing. Discussions are underway on video compression techniques for effectively providing high-resolution and ultra-high-resolution stereoscopic image content.

DISCLOSURE

Technical Problem

The present disclosure is to improve a coding efficiency of a video signal.

Technical Solution

A decoding method and apparatus according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

In the decoding method and apparatus according to the present disclosure, modifying may comprise, generating a second prediction block of the current block based on the intra prediction mode, and combining the first prediction block and the second prediction block.

In the decoding method and apparatus according to the present disclosure, the intra prediction mode may be a pre-promised fixed mode in a decoding apparatus.

In the decoding method and apparatus according to the present disclosure, the pre-promised fixed mode may be any one of a planar mode or a DC mode.

In the decoding method and apparatus according to the present disclosure, the inter prediction candidate list may include at least one of a spatial merge candidate and a temporal merge candidate.

In the decoding method and apparatus according to the present disclosure, the inter prediction candidate list may further include a combined merge candidate, and the combined merge candidate may be derived through an average of at least two merge candidates belonging to the inter prediction candidate list.

In the decoding method and apparatus according to the present disclosure, the modification of the first prediction block may be selectively performed according to a flag indicating whether modification based on intra prediction is performed.

In the decoding method and apparatus according to the present disclosure, the flag may be signaled or derived in consideration of at least one of a type of a slice to which the current block belongs, an inter prediction mode of the current block, or a size of the current block.

An encoding method and apparatus according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

A non-transitory computer-readable storage medium according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

Advantageous Effects

The video signal processing method and apparatus according to the present disclosure may improve video signal coding efficiency through inter prediction.

DESCRIPTION OF DRAWINGS

FIGS. 5 to 17 show an embodiment to which the present disclosure is applied.

BEST MODE FOR DISCLOSURE

Figure 1:
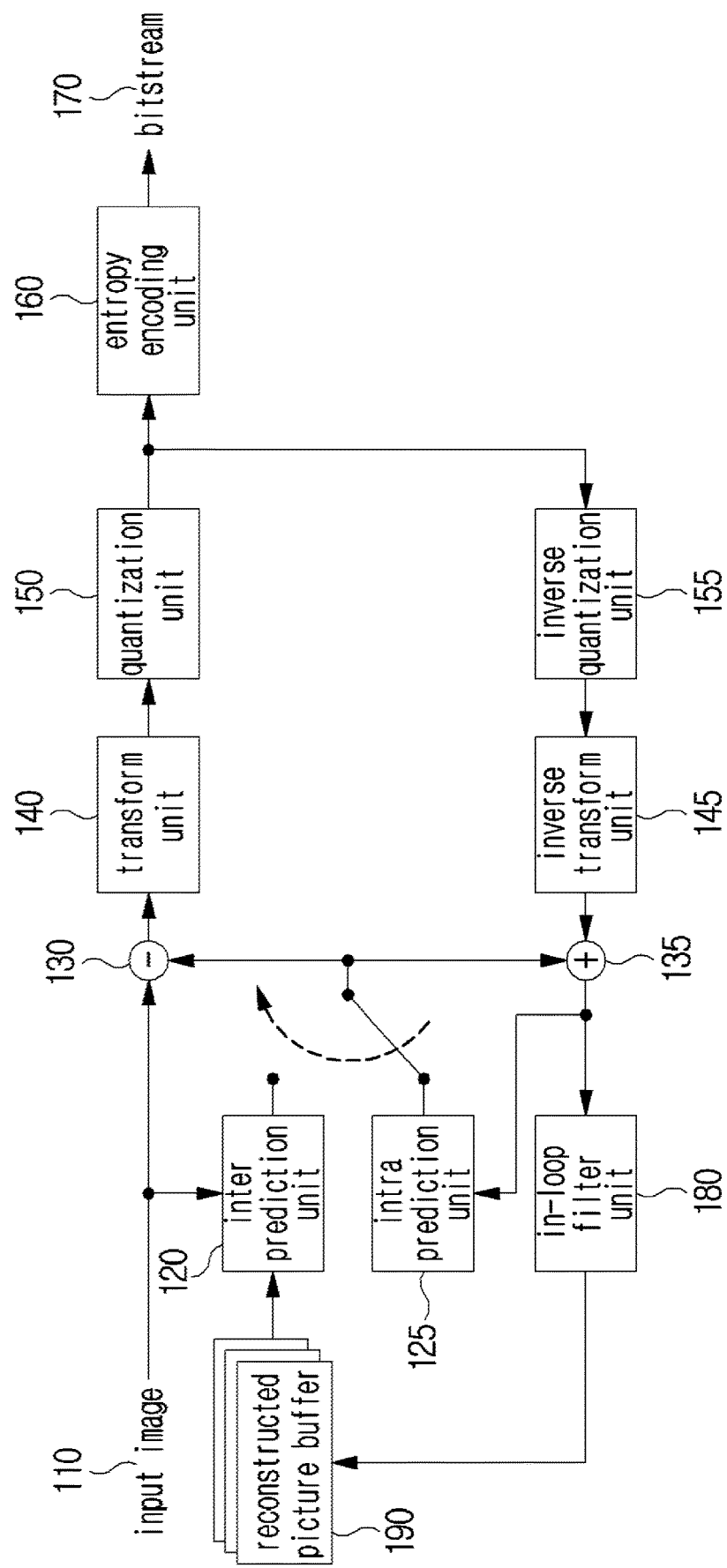
FIG. 1 is a block diagram illustrating a configuration of a video encoding method and apparatus according to an embodiment of the present disclosure.

A decoding method and apparatus according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

In the decoding method and apparatus according to the present disclosure, modifying may comprise, generating a second prediction block of the current block based on the intra prediction mode, and combining the first prediction block and the second prediction block.

In the decoding method and apparatus according to the present disclosure, the intra prediction mode may be a pre-promised fixed mode in a decoding apparatus.

In the decoding method and apparatus according to the present disclosure, the pre-promised fixed mode may be any one of a planar mode or a DC mode.

In the decoding method and apparatus according to the present disclosure, the inter prediction candidate list may include at least one of a spatial merge candidate and a temporal merge candidate.

In the decoding method and apparatus according to the present disclosure, the inter prediction candidate list may further include a combined merge candidate, and the combined merge candidate may be derived through an average of at least two merge candidates belonging to the inter prediction candidate list.

In the decoding method and apparatus according to the present disclosure, the modification of the first prediction block may be selectively performed according to a flag indicating whether modification based on intra prediction is performed.

In the decoding method and apparatus according to the present disclosure, the flag may be signaled or derived in consideration of at least one of a type of a slice to which the current block belongs, an inter prediction mode of the current block, or a size of the current block.

An encoding method and apparatus according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

A non-transitory computer-readable storage medium according to the present disclosure may determine at least one of a plurality of inter prediction modes as an inter prediction mode of a current block, construct an inter prediction candidate list based on the determined inter prediction mode, generate a first prediction block of the current block by performing motion compensation based on any one prediction candidate in the inter prediction candidate list, and modify the first prediction block using a predetermined intra prediction mode.

MODE FOR DISCLOSURE

An embodiment of the present disclosure will be described in detail with reference to the accompanying drawings in the present specification so that those of ordinary skill in the art may easily implement the present disclosure. However, the present disclosure may be implemented in various different forms and is not limited to the embodiments described herein. In addition, in the drawings, parts irrelevant to the description are omitted in order to clearly describe the present disclosure, and similar reference numerals are attached to similar parts throughout the specification.

Throughout this specification, when a certain part is said to be 'connected' with the other part, this includes not only a case in which it is directly connected, but also a case in which it is electrically connected with the other element interposed therebetween.

In addition, when a part of the present specification is said to "include" a certain component, it means that other components may be further included rather than excluding other components unless otherwise stated.

In addition, terms such as first and second may be used to describe various components, but the components should not be limited by the terms. The above terms are used only for the purpose of distinguishing one component from another component.

In addition, in the embodiments of the apparatus and method described in the present specification, a part of the components of the apparatus or a part of the steps of the method may be omitted. In addition, a part of the components of the apparatus or an order of a part of the steps of the method may be changed. In addition, other components or other steps may be inserted into a part of the components of the apparatus or a part of the step of the method.

In addition, some components or some steps of a first embodiment of the present disclosure may be added to a second embodiment of the present disclosure, or may be replaced some components or some steps of the second embodiment.

In addition, components shown in the embodiments of the present disclosure are independently shown to represent different characteristic functions, and it does not mean that each component unit is formed of separate hardware or a single software component. That is, each component unit is described by being listed as a respective component unit for convenience of explanation, and at least two component units of each component unit may be combined to form a single component unit, or one component unit may be divided into a plurality of component units to perform a function. Integrated embodiments and separate embodiments of each of these components are also included in the scope of the present disclosure unless departing from the essence of the present disclosure.

First, briefly describing terms used in the present application are as follows.

The decoding device (Video Decoding Apparatus) to be described below may be a civil security camera, a civil security system, a military security camera, a military security system, a Personal Computer (PC), a laptop computer, a Portable Multimedia Player (PMP), a wireless communication terminal, a smartphone, or a device included in server terminals such as TV application servers and service servers, and may mean a user terminal such as various devices, a communication device such as a communication modem for performing communication with wired and wireless communication networks, a memory for storing various programs and data for decoding an image or performing intra prediction or inter prediction for the decoding, or various devices equipped with microprocessors, etc., to run programs to operate and control.

In addition, an image encoded as a bitstream by an encoder may be transmitted to the video decoding device through wired and wireless communication networks such as Internet, local area wireless communication network, wireless LAN network, WiBro network, and mobile communication network in real time or non-real time, or through various communication interfaces such as cables and Universal Serial Buses (USB), decoded, reconstructed as an image, and reproduced. Alternatively, a bitstream generated by an encoder may be stored in a memory. The memory may include both volatile memory and nonvolatile memory. In this specification, the memory may be expressed as a recording medium storing a bitstream.

In general, a moving picture may be composed of a series of pictures, and each picture may be divided into a coding unit such as a block. In addition, it will be understood by those of ordinary skill in a technical field to which the present disclosure belongs that the term 'picture' described below may be substituted with other terms having an equivalent meaning, such as 'image' and 'frame'. In addition, it will be understood by those of ordinary skill in the art that the term 'coding unit' may be substituted with other terms having an equivalent meaning such as 'unit block' and 'block'.

Hereinafter, with reference to the accompanying drawings, it will be described in more detail an embodiment of the present disclosure. In describing the present disclosure, duplicate descriptions of the same components will be omitted.

FIG. 1 is a block diagram illustrating a configuration of a video encoding method and apparatus according to an embodiment of the present disclosure.

A video encoding method and apparatus according to an embodiment may include an inter prediction unit 120, an intra prediction unit 125, a subtraction unit 130, a transform unit 140, a quantization unit 150, and an entropy encoding unit 160, an inverse transform unit 145, an inverse quantization unit 155, an addition unit 135, a bi-directional filter unit 180, an in-loop filter unit 180, and a reconstructed picture buffer 190.

The inter prediction unit 120 generates a prediction signal by performing motion prediction using an input image 110 and a reconstructed image stored in the reconstructed picture buffer 190.

The intra prediction unit 125 generates a prediction signal by performing spatial prediction using pixel values of pre-reconstructed neighboring blocks spatially adjacent to the current block to be encoded.

The subtraction unit 130 generates a residual signal by using the input image and the prediction signal generated by the inter prediction unit 120 or the intra prediction unit 125.

The transform unit 140 and the quantization unit 150 transform and quantize the residual signal generated through the subtraction unit 130 to generate a quantized coefficient.

The entropy encoding unit 160 performs entropy encoding on encoding information such as syntax elements and quantized coefficients defined in a video compression standard and outputs a bitstream.

The inverse transform unit 145 and the inverse quantization unit 155 receive quantization coefficients, perform inverse quantization and inverse transform in sequence, and generate a reconstructed residual signal.

The addition unit 135 generates a reconstructed signal using the prediction signal generated by the inter prediction unit 120 or the intra prediction unit 125 and the reconstructed residual signal.

The reconstructed signal is transmitted to the in-loop filter unit 180 and a final reconstructed picture is generated by applying one or more in-loop filters such as a deblocking filter, a sample adaptive offset (SAO), and an adaptive loop filter (ALF) to store in the reconstructed picture buffer 190.

The reconstructed picture stored in the reconstructed picture buffer 190 may be used as a reference picture in the inter prediction unit 120.

Figure 2:
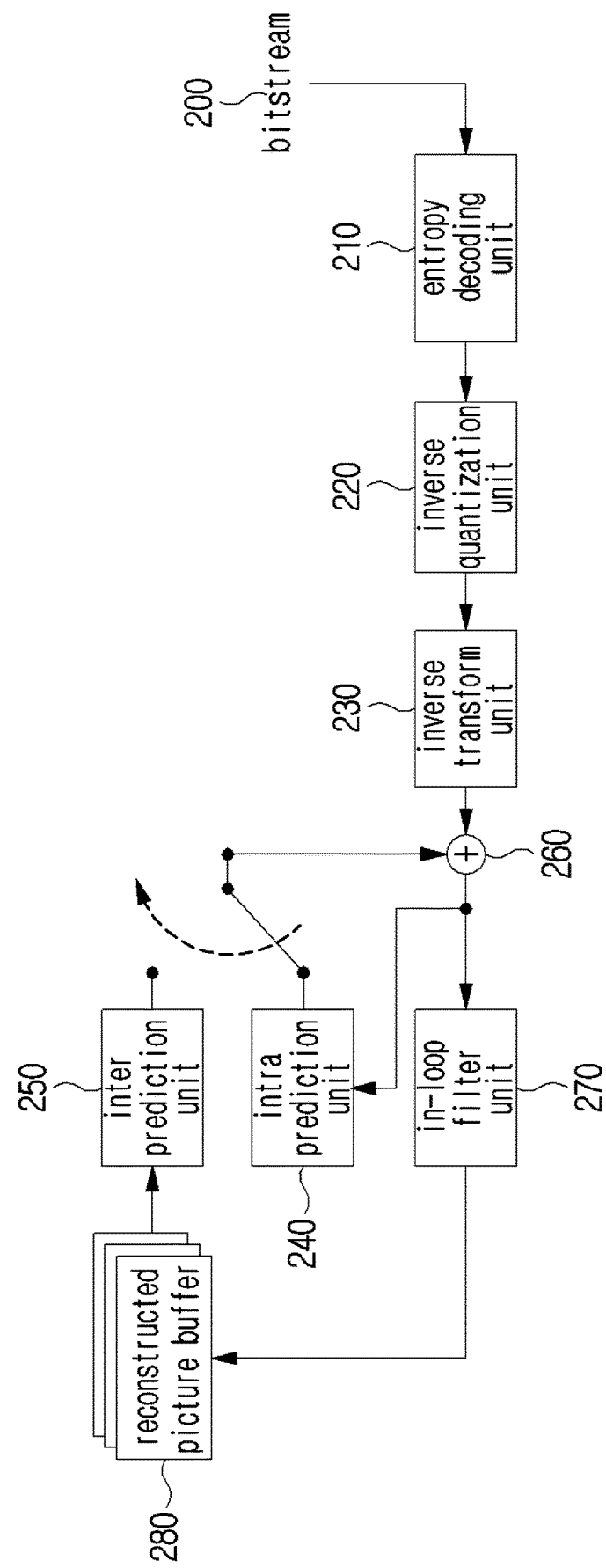
FIG. 2 is a block diagram illustrating a configuration of a video decoding method and apparatus according to an embodiment of the present disclosure.

FIG. 2 is a block diagram illustrating a configuration of a video decoding method and apparatus according to an embodiment of the present disclosure.

A video decoding apparatus and method according to an embodiment may include an entropy decoding unit 210, an inverse quantization unit 220, an inverse transform unit 230, an intra prediction unit 240, an inter prediction unit 250, and an addition unit 260, a bi-directional filter unit 270, an in-loop filter unit 280, and a reconstructed picture buffer 290.

The entropy decoding unit 210 decodes an input bitstream 200 and outputs decoding information such as syntax elements and quantized coefficients.

The inverse quantization unit 220 and the inverse transform unit 230 receive quantization coefficients, perform inverse quantization and inverse transform in sequence, and output a residual signal.

The intra prediction unit 240 generates a prediction signal by performing spatial prediction using pixel values of pre-decoded neighboring blocks adjacent to the current block to be decoded.

The inter prediction unit 250 generates a prediction signal by performing motion compensation using a motion vector extracted from a bitstream and a reconstructed image stored in the reconstructed picture buffer 280.

The addition unit 260 generates a reconstructed signal using the prediction signal generated by the intra prediction unit 240 or the inter prediction unit 250 and the reconstructed residual signal.

The bi-directional filter unit 270 performs a bi-directional filter on the reconstructed signal generated through the addition unit 260 to generate a signal to which the filter is applied.

The reconstructed signal is transmitted to the in-loop filter unit 270 and a final reconstructed picture is generated by applying one or more in-loop filters such as a deblocking filter, a sample adaptive offset (SAO), and an adaptive loop filter (ALF) to store in the reconstructed picture buffer 280.

The reconstructed picture stored in the reconstructed picture buffer 280 may be used as a reference picture in the inter prediction unit 250.

Figure 3:
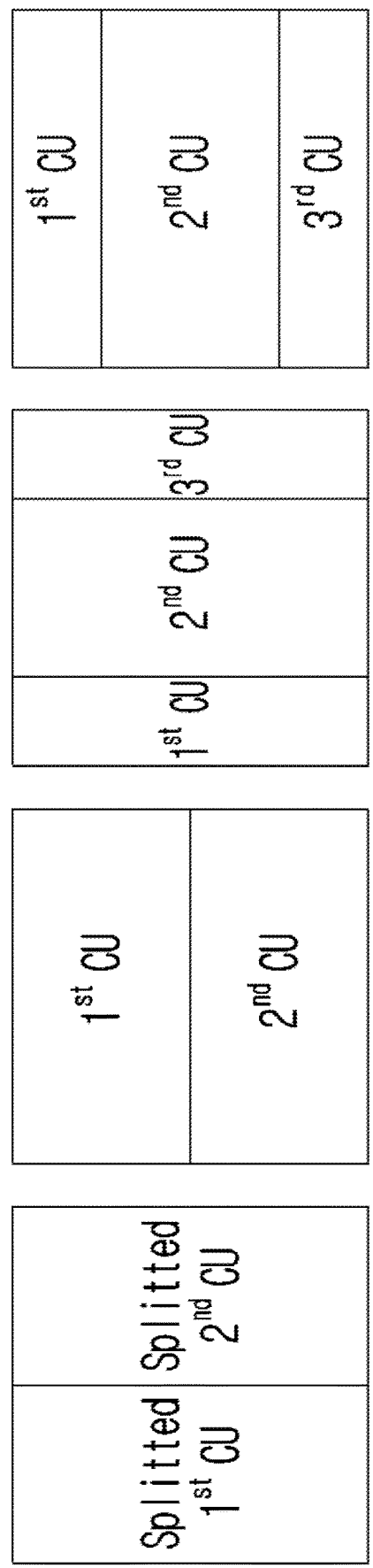
FIG. 3 is a diagram illustrating a tree structure-based split method as an embodiment to which the present disclosure is applied.

FIG. 3 is a diagram illustrating a tree structure-based split method as an embodiment to which the present disclosure is applied.

The tree structure-based split may be performed based on at least one of a quad-tree, a binary-tree, and a ternary-tree. The quad-tree may be a type of splitting a higher coding block into four lower coding blocks. Here, each of a width and a height of the lower coding block may be half of a width and height of the higher coding block. The binary-tree may be a type in which a higher coding block is split into two lower coding blocks. For example, as shown in FIG. 3, the higher coding block may be split into two in a horizontal direction or a vertical direction. In this case, the width or height of the lower coding block may be half of the width or height of the higher coding block. The ternary-tree may be of a type in which a higher coding block is split into three lower coding blocks. For example, as shown in FIG. 3, the ternary-tree, like the binary-tree, may be split into three in a horizontal direction or a vertical direction. In this case, a ratio of the width or height of the three lower coding blocks may be 1:2:1, 1:1:2, or 2:1:1.

The above-described split type may be applied based on a priority pre-promised in an encoding/decoding apparatus. For example, at least one of the binary-tree and the ternary-tree may be allowed only when block split based on the quad-tree is no longer performed. However, the present disclosure is not limited thereto, and after block split based on at least one of the binary-tree and the ternary-tree is performed, block split based on the quad-tree may be additionally performed.

The block split may be performed based on predetermined split information. The split information may include at least one of first information indicating whether to split, second information indicating a split direction, or third information indicating a split type or number of partitions. The first information may include at least a first flag indicating whether the current coding block is split based on the above-described tree structure, a second flag indicating whether the current coding block is split based on the quad-tree, or a third flag indicating whether the current coding block is additionally split based on a tree structure other than the quad-tree. At least one of the above-described split information may be encoded and signaled by an encoding apparatus, or may be derived by a decoding apparatus based on a predetermined coding parameter. Here, the coding parameter may include block size/shape, split depth, block position (e.g., whether the block is located at the boundary of a predetermined fragment region), transform type (e.g., DCT, DST, transform skip, etc.), component type (e.g., luminance, chrominance), split type of neighboring blocks, etc.

For example, when the first flag is true, the second flag indicating whether to split based on the quad-tree is signaled, and when the second flag is false, the current coding block is no longer split. When the second flag is true, the current coding block is split into four coding blocks, and when the second flag is false, the current coding block may be split based on the binary-tree or the ternary-tree. To this end, second information indicating a split direction and third information indicating a split type may be signaled. When the second information is a first value, it may be split in the vertical direction, otherwise, it may be split in the horizontal direction. When the third information is a first value, the binary-tree may be applied, otherwise, the ternary-tree may be applied. Alternatively, when the second flag is false, a third flag indicating whether to split based on a tree structure other than the quad-tree may be signaled. In this case, when the third flag is true, block split based on the binary-tree or the ternary-tree may be performed based on the second information indicating the split direction and the third information indicating the split type.

On the other hand, when the current coding block is larger than a predetermined threshold size, only the quad-tree is allowed, otherwise, split based on the quad-tree, the binary-tree, and the ternary-tree may be allowed. The threshold size may be a fixed value (e.g., 128, 64, 32) pre-set in the encoding/decoding apparatus, or may be encoded and signaled by the encoding apparatus. When the current coding block is larger than a predetermined threshold size, since only quad-tree division is allowed, the above-described split information may not be signaled.

Hereinafter, the terms block, coding block, current coding block, and current block may be understood to mean a coding block of a leaf node in which the above-described tree structure-based split is no longer performed. The coding block may be interpreted in the same meaning as the coding block. The sub-block may be understood to mean a sub-block constituting the coding block of the leaf node. The inter prediction information may mean candidate motion information for motion compensation of the current block or candidate block information having the corresponding motion information. Alternatively, in some cases, the inter prediction information may mean motion information used for motion compensation of the current block among candidate motion information. The motion information may include at least one of a motion vector, a reference picture index, a prediction direction (e.g., L0 prediction, L1 prediction), and reference picture list information.

Inter prediction is generating a prediction block by using a motion vector and a reconstructed image stored in a decoded picture buffer (DPB), is performed through motion estimation and motion compensation.

Motion estimation may represent a process of finding an optimal prediction block from pictures used for inter prediction which are stored in the decoded picture buffer, and motion compensation may represent a process of generating a prediction block based on motion information (motion vector, reference picture index) for the optimal prediction block found in the motion estimation process.

In addition, inter prediction may be divided into a uni-directional prediction that uses only one picture of the past or future on the time axis as a reference picture for one block, and bi-directional prediction that simultaneously references pictures of the past and the future. This may be determined by a slice type.

In inter prediction, one slice may be divided into a P-slice and a B-slice, and inter prediction of the P-slice may perform only uni-directional prediction, and inter prediction of the B-slice may selectively use any one of uni-directional prediction and bi-directional prediction.

In addition, the uni-directional prediction may be classified into a forward direction prediction using one reference picture displayed (or output) temporally before a current picture, and a backward direction prediction one reference picture displayed (or output) temporally after the current picture.

Motion information (or parameters) used for specifying which reference region (or reference block) is used to predict a current block in an inter prediction process (i.e., uni-directional or bi-directional prediction) may include an inter prediction mode (here, the inter prediction mode may indicate a reference direction (i.e., uni-directional or bi-directional) and a reference list (i.e., L0, L1 or bi-directional)), a reference index (or a reference picture index or a reference list index), motion vector information. The motion vector information may include a motion vector, a motion vector prediction (MVP), or a motion vector difference (MVD). The motion vector difference means a difference between the motion vector and the motion vector predictor.

In inter prediction coding/decoding, inter prediction motion information of a neighboring block is used to reduce motion information transmitted when deriving prediction information of a current block. The inter prediction mode may be classified into an AMVP method that derives a motion vector predictor from the motion information of a neighboring block in order to reduce searched inter prediction information, and a merge/skip method that uses the prediction motion information of the neighboring block as it is. In addition, each method may be classified into a mode in units of coding blocks or a mode in units of sub-blocks according to a block unit to be performed. The sub-block unit merge/skip method may include at least one of ATMVP, STMVP, and affine mode, and the sub-block unit AMVP mode may include at least one of ATMVP, STMVP, and affine mode. In the sub-block unit AMVP mode, it may be restricted so that at least one of ATMVP or STMVP is not used.

Hereinafter, the neighboring block may include at least one of a spatial neighboring block or a temporal neighboring block. The spatial neighboring block may be a block adjacent to at least one of a left, a top, a top-left, a top-right, or a bottom-left of the current block, or may be a block separated by a predetermined distance. Here, the predetermined distance may be determined based on a block parameter or may be a fixed value pre-promised to an encoder/decoder. The block parameter may include a width/height, a shape, a depth, a partitioning technique (e.g., a quad-tree, a binary-tree, a ternary-tree, triangular partitioning, etc.) of a block. In this case, the block parameter may be related to the current block and/or the neighboring block. The temporal neighboring block is a block belonging to a picture different from the current block, and may mean a block (hereinafter, referred to as a col block) at the same position as the current block. The col block may include at least one of a block including a center position of the current block or a block adjacent to each corner (e.g., top-left, bottom-right, etc.) of the current block.

The ATMVP and affine merge/inter method determines whether motion information is available in a spatial neighboring block according to a predetermined order, and derives necessary motion information. Even if a block position for determining whether information of neighboring block is available are the same, the order given for searching between techniques may be different.

The predetermined order may be a fixed order pre-defined in the encoder/decoder, or may be variably determined based on the above-described coding parameters.

The coding parameter may include information on a block attribute. Here, the block attribute may mean position, size, shape, ratio of width and height, length value of width and height, division technique (e.g., quad-tree, binary-tree, ternary-tree), division depth, inter prediction mode (e.g., whether it is a merge mode, whether it is an affine mode), an affine mode type (4-parameter, 6-parameter), etc. The block attribute may mean an attribute of the current block and/or a neighboring block of the current block. The position may mean whether the block (CU) or the sub-block is located on a boundary of a predetermined segment region, or may mean the location of the sub-block within the block. The predetermined segment region may mean a tile, a slice, a CTU row, or a CTU. The predetermined order may be determined based on a comparison between the block attribute and a first threshold pre-determined by the encoder/decoder.

In the present disclosure, a process of searching for neighboring blocks redundantly can be prevented without deteriorating coding performance by searching in consideration of correlation with the current block, in the same order which is to search for neighboring blocks in order to construct a candidate in the sub-block inter prediction process.

The inter prediction mode may be classified into an AMVP method that derives a motion vector predictor from a neighboring block and a merge/skip method that uses the inter prediction motion information of the neighboring block as it is. In addition, each method may be classified into a mode in units of coding blocks or a mode in units of sub-blocks according to a block unit to be performed. Among them, in the case of the inter prediction mode in units of sub-blocks, a candidate list is constructed by means of an inherited affine inter prediction using an affine model of a neighboring block that is predicted and encoded using the affine model, a combined affine inter prediction using by deriving an affine model form motion information of a neighboring block, ATMVP, etc. In each of the inter prediction modes, a list containing a specific number of candidates may be constructed to use motion information of neighboring blocks, and the neighboring blocks are searched in a specific order to fill the list.

In order to construct a candidate list for the inter prediction mode in units of sub-blocks, the ATMVP, the inherited affine inter prediction, the combined affine inter prediction may be used. In this case, in order to construct the corresponding prediction mode, the temporal/spatial neighboring blocks may be searched in a specific order according to the correlation with the current block, and a candidate list may be constructed without redundantly searching the neighboring blocks without deteriorating coding performance.

When constructing candidate lists in the inter prediction in units of sub-blocks, motion information of temporal/spatial neighboring blocks of the current block is used. The motion information having a higher priority in the candidate list may be transmitted by allocating a lower bit. By collectively searching neighboring blocks with high correlation for several modes for constructing a list, it is possible to reduce the inefficient complexity of individually searching the same location multiple times.

Figure 4:
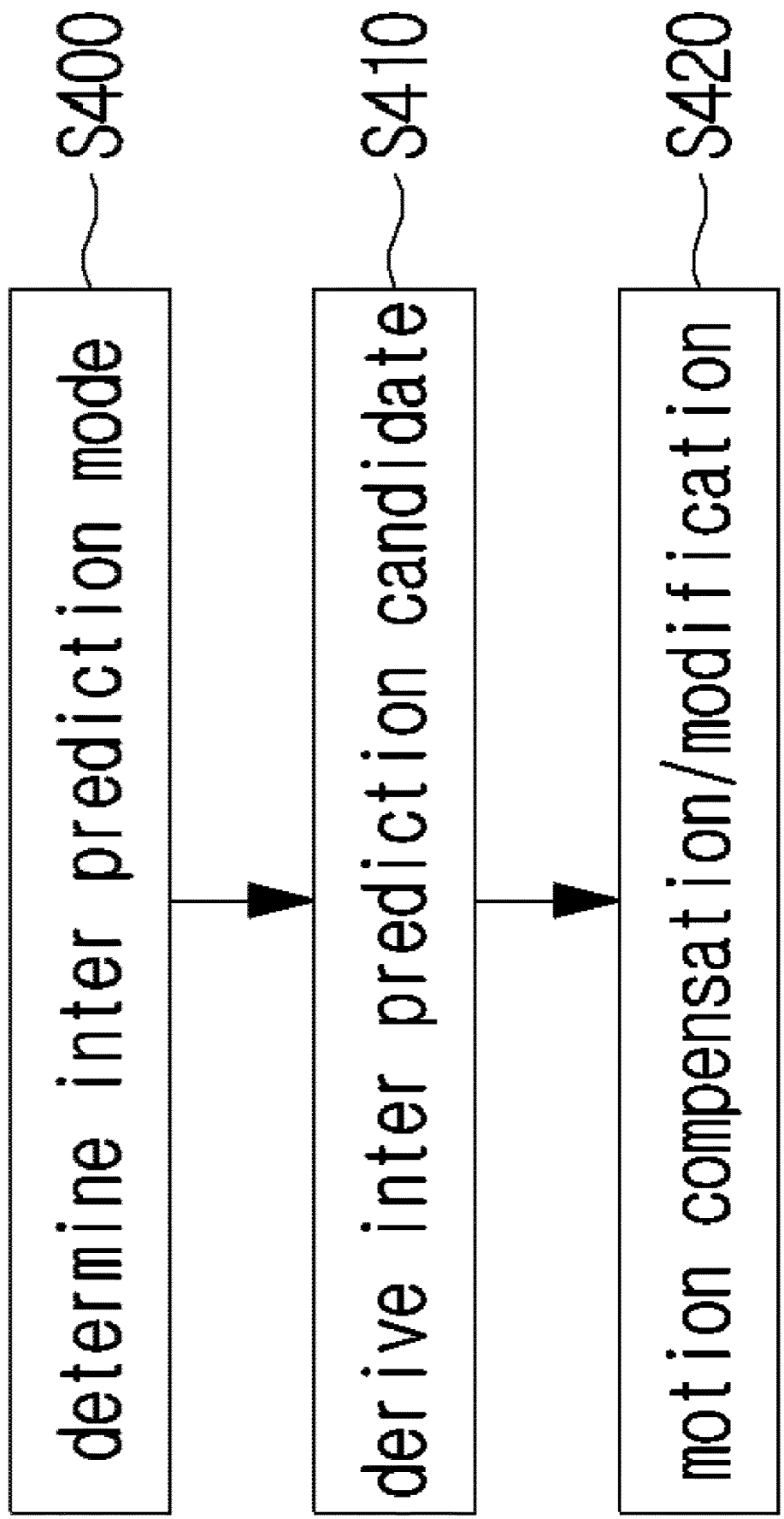
FIG. 4 is a diagram illustrating a method of performing motion compensation based on an inter prediction mode pre-defined in an encoding/decoding apparatus according to an embodiment to which the present disclosure is applied.

FIG. 4 is a diagram illustrating a method of performing motion compensation based on an inter prediction mode pre-defined in an encoding/decoding apparatus according to an embodiment to which the present disclosure is applied.

In the present disclosure, in performing an inter prediction encoding/decoding for a current block, an encoding/decoding method and apparatus for inter prediction including an inter prediction mode determination step (S400), an inter prediction candidate derivation step (S410), motion compensation/modification step (S420) are proposed.

In the inter prediction mode determination step (S400), at least one of a skip mode, a merge mode, and an AMVP mode may be determined as an inter prediction mode of the current block.

Additionally, at least one of the following modes may be determined as the inter prediction mode of the current block. In this case, the determination may be performed based on at least one of the skip mode, the merge mode, and the AMVP mode.

sub-block unit merge mode
sub-block unit skip mode
sub-block unit AMVP mode
MMVD mode
MH intra mode
triangular mode The inter prediction candidate derivation step (S410) may construct an inter prediction candidate list using at least one of inter prediction information of a spatial neighboring block, inter prediction information of a temporal neighboring block, HMVP, synthetic inter prediction information, combined affine inter prediction information, inherited affine inter prediction information, ATMVP, or STMVP.

Additionally, in constructing the list, at least one of the following inter prediction information may be used.

MV (motion vector)
   reference picture direction
   reference picture index
   affine flag: specifies whether to use affine mode
   MMVD flag: specifies whether to use MMVD mode
   MH intra flag: specifies whether to use MH intra mode
   triangular flag: specifies whether to use triangular mode
   CPMV (control point motion vector)

In the motion compensation/modification step (S420), inter prediction and motion compensation/modification may be performed using at least one of motion compensation, illumination compensation (IC), OBMC, BIO, affine motion compensation, or decoding-side motion compensation. In addition, the motion compensation/modification step S420 may include a process of modifying a prediction block according to the motion compensation. Here, the modification may mean a process of combining the prediction block according to the motion compensation and a prediction block obtained by performing intra prediction on the current block.

Specifically, in inter prediction mode determination step (S400), at least one prediction mode among skip, merge, and AMVP in the inter prediction for the current block may be determined as the inter prediction mode of the current block.

The inter prediction mode of the current block may be determined as the merge mode.

When the merge mode is determined, the prediction block of the current block may be obtained by applying the same motion information of a neighboring block to the current block. Here, the neighboring block may be any one of a left block (F), a top block (D), a bottom-left block (G), a top-right block (E), or a top-left block (A).

Figure 5:
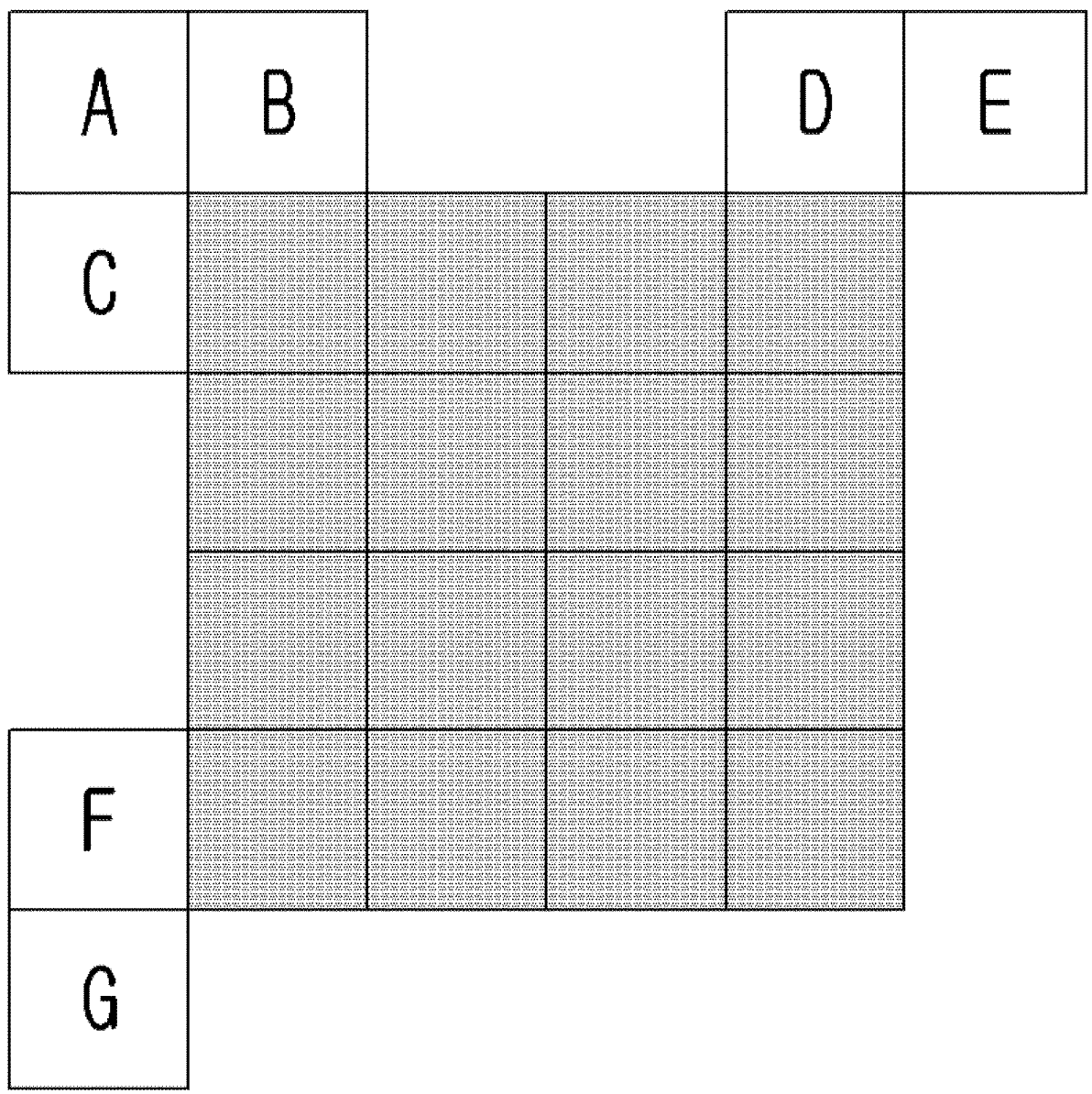

For example, at least one of motion information of a left block existing at positions F and G of FIG. 5 may be used. For example, at least one of motion information of a top block existing at positions D and E of FIG. 5 may be used. For example, motion information of a top-left block existing at position A of FIG. 5 may be used.

Prediction on the current block may be performed through a neighboring block, and a residual block may be generated accordingly.

Among the neighboring blocks, inter prediction information of a neighboring block, which consumes a minimum cost for encoding the prediction information and the residual block, may be used for encoding the current block.

The inter prediction mode of the current block may be determined as the skip mode.

When the skip mode is determined, motion information of a neighboring block is used as motion information for the current block.

For example, at least one of motion information of a left block existing at positions F and G of FIG. 5 may be used. For example, at least one of motion information of a top block existing at positions D and E of FIG. 5 may be used. For example, motion information of a top block existing at position A of FIG. 5 may be used.

Prediction on the current block is performed through a neighboring block, and a residual block is not generated accordingly.

The inter prediction mode of the current block may be determined as the AMVP mode.

When the AMVP mode is determined, motion information of a neighboring block may be used as predicted motion information for the current block.

For example, at least one of motion information of a left block existing at positions F and G of FIG. 5 may be used. For example, at least one of motion information of a top block existing at positions D and E of FIG. 5 may be used. For example, motion information of a top block existing at position A of FIG. 5 may be used.

The predicted motion information for the current block may be obtained through a neighboring block, and a prediction block for the current block may be obtained through additional search based on the corresponding motion information.

Among the neighboring blocks, inter prediction information of a neighboring block, which consumes a minimum cost for encoding the prediction information and a residual block, may be used for encoding the current block.

After determining the inter prediction mode, additionally, at least one prediction mode among the sub-block unit merge mode, the sub-block unit skip mode, the sub-block unit AMVP mode, the MMVD mode, the MH intra mode, or the triangular mode may be determined as the inter prediction mode of the current block. In this case, the determination may be made through information such as a flag, an index, etc. The information such as the flag, the index, etc. may be signaled by an encoder or derived from a decoder based on a predetermined coding parameter.

The prediction mode in units of sub-blocks may divide the current block into M sub-blocks and may have n inter prediction information. Here, M may be greater than or equal to n. When M>n, a plurality of sub-blocks belonging to the current block may share one inter prediction information. In this case, the plurality of sub-blocks may be blocks adjacent to each other, or blocks that are not adjacent to each other in the current block. A size of the sub-block may be at least one of 4×4, 4×8, 8×4, 4×16, 16×4 . . . 2N×N, N×2N, and may be fixed to a predetermined size.

In deriving motion information in units of sub-blocks, the size of the sub-block may be determined as a size of a sub-block having the least cost. In this case, the cost may be obtained by at least one of methods such as SATD, SAD, RD-cost, and average block size of a previous picture. When there is no motion information for a sub-block unit of a reference block, it may be replaced with motion information of a sub-block at a predetermined position. The predetermined position may mean a position at the bottom-right or center in the reference block, or a position at the bottom-right corner of the reference block, etc. Here, the position at the bottom-right corner may mean a position of a block adjacent to the right, bottom, or bottom-right based on the bottom-right sample of the reference block.

In determining the inter prediction mode of the current block, a sub-block unit merge mode may be determined.

The sub-block unit merge mode of the current block may be performed in one or more method among the ATMVP and the affine modes. That is, when the inter prediction mode of the current block is the ATMVP mode or the Affine mode, the merge in units of sub-blocks may be applied.

The affine merge mode may derive N positive integer positions and CPMVs of those positions from neighboring blocks.

For example, the top-left, top-right, or bottom-left CPMV (control point MV) of the current block may be derived using at least one of the top-left, top-right, or bottom-left CPMV of the left block existing at positions F and G of FIG. 5. This may be any one of a plurality of candidate CPMVs for the current block.

For example, the top-left, top-right, or bottom-left CPMV of the current block may be derived using at least one of the top-left, top-right, or bottom-left CPMV of the top block existing at positions E, D, and A of FIG. 5. This may be any one of a plurality of candidate CPMVs for the current block. Alternatively, the top-left, top-right, or bottom-left CPMV of the current block may be derived using at least one of the top-left, top-right, or bottom-left CPMV of at least one of kth group (k=1, 2, and 3) described above. This may be any one of a plurality of candidate CPMVs for the current block.

In FIG. 5, the CPMVs of the current block may be derived by selecting any one of a first group (A, B, C), a second group (D, E), or a third group (F, G). Alternatively, the CPMVs of the current block may be derived by selecting at least one of the first group, at least one of the second group, and at least one of the third group.

The selection may be performed based on a predetermined priority. For example, the first group may have a priority over the second group or the third group. The third group may have a priority over the first group or the second group. The priority between blocks within each group may be bottom→top and left→right, or right→left and top→bottom. Alternatively, it may be left→right and top→bottom, or the reverse direction. The priority may be the same regardless of the position of the group, or may be set differently for each group.

The derivation may be performed in units of sub-blocks of the current block. In the derivation process, the use of a specific group may be restricted according to the position of the sub-block in the current block. For example, only the first/second group may be used, only the first/third group may be used, or only the second/third group may be used. Alternatively, the CPMVs of the current block may be derived using a block pair pre-defined in the encoder/decoder. Any one of the block pairs may belong to any one of the first group to the third group, and the other may belong to another group. The block pair may be defined differently for each current sub-block.

In performing the sub-block unit merge mode of the current block, prediction information may be constructed and signaled with at least one of a merge index or a residual signal.

Sub-block unit inter prediction information of a neighboring block, which consumes a minimum cost, may be used for encoding the current block.

In determining the inter prediction mode of the current block, a sub-block unit skip mode may be determined.

In performing the sub-block unit skip mode of the current block, prediction information may be constructed and signaled with a merge index.

Among the neighboring blocks, a sub-block unit inter prediction information of a neighboring block, which consumes a minimum cost for a prediction information, may be used for encoding the current block.

The sub-block unit prediction information of the neighboring block may be used as sub-block unit motion information of the current block, and a residual block may not be generated accordingly.

In determining the inter prediction mode of the current block, a sub-block unit AMVP mode may be determined.

The sub-block unit AMVP mode of the current block may be applied when the inter prediction mode of the current block is the affine mode.

In performing the sub-block unit AMVP mode of the current block, prediction information may be constructed and signaled with an AMVP index, a motion information difference (MVD), a reference picture index, a reference direction, and a residual signal.

Sub-block unit inter prediction information of a neighboring block, which consumes a minimum cost, may be used for encoding the current block. In determining the inter prediction mode of the current block, an MMVD mode may be determined.

When deriving the inter prediction information of the current block, motion information of neighboring blocks may be used.

For example, motion information existing in a merge candidate list may be used.

A certain direction and a size of MVD (motion vector difference) may be signaled and used for motion information of a neighboring block.

Prediction for the current block may be performed through motion information of a neighboring block and additional signaling, and a residual block may be generated accordingly.

At least one or more inter prediction information, additional direction information, and MVD size information among neighboring blocks may be used for encoding the current block. Here, the direction information may indicate any one of up, down, left, or right directions.

In determining the inter prediction mode of the current block, an MH intra mode may be determined.

The MH intra mode may be a mode for obtaining a first prediction block of the current block through inter prediction, obtaining a second prediction block of the current block through intra prediction, and obtaining a final prediction block by combining the first and second prediction blocks. The first prediction block may be obtained using any one of the above-described inter prediction modes (i.e., a block unit skip mode, a sub-block unit skip mode, merge mode, AMVP mode). The second prediction block may be obtained using an intra prediction mode derived based on MPM or an intra prediction mode pre-defined in the encoding/decoding apparatus.

For example, in performing the MH intra mode of the current block, a merge index and an intra prediction mode may be signaled. In order to derive the intra prediction mode, most probable mode (MPM) candidate information may be constructed.

For coding of the current block, a merge index and most probable mode (MPM) candidate information for intra prediction may be used. The MPM may be constructed using an intra prediction mode of a neighboring block adjacent to the current block among intra prediction modes, as a candidate of the current intra prediction mode.

In determining the inter prediction mode of the current block, a triangular mode may be determined.

The inter prediction information of the current block may be derived using motion information of one or more neighboring blocks. In this case, the derivation may be performed by combining motion information of the plurality of neighboring blocks. Triangular partitions belonging to the current block may share one candidate list, and an index for specifying motion information for each partition may be signaled.

The inter prediction information of the current block may be used by combining motion information of two or more neighboring blocks with intra prediction.

For example, by dividing the current block in a diagonal direction, motion information of other neighboring blocks may be obtained.

In performing the triangular mode of the current block, prediction information may be constructed and signaled using a triangular index and a residual signal.

Combination of inter prediction information of two or more neighboring blocks, which consume a minimum cost, may be used for encoding the current block.

The inter prediction candidate derivation step (S410); In deriving inter prediction candidates, at least one of inter prediction information of a spatial neighboring block, inter prediction information of a temporal neighboring block, history-based motion vector predictor (HMVP), synthetic inter prediction information, combined affine inter prediction information, inherited affine inter prediction information, ATMVP, STMVP may be derived as the candidate. An inter prediction candidate list may be constructed using the one or more prediction candidates, and the prediction candidates may include at least one information of a motion vector, a reference direction, a reference picture index, an affine flag, an MH intra flag, an MMVD flag, a triangular flag, and a CPMV. The inter prediction candidate list may be one or more.

The affine flag is a flag indicating whether an inter prediction mode in units of sub-blocks is used. The affine flag is a flag indicating whether an affine mode in units of blocks or in units of sub-blocks is used.

The MH intra flag is a flag indicating whether the MH intra mode is used.

The MMVD flag is a flag indicating whether the MMVD prediction mode is used.

The triangular flag is a flag indicating whether the triangular prediction mode is used.

The CPMV (Control Point Motion Vector) may be a motion vector used for coding using an affine. The CPMV may be motion information in units of sub-blocks including at least one of a position of a top-left, a top-right, a bottom-left, or a bottom-right of a block coded with the affine. The CPMV of the current block may be derived from the CPMV of the previous block encoded/decoded with the affine through Equation 1. One (2-parameter), two (4-parameter) or more than two (6-parameter, . . . ) of CPMVs may be used to apply the affine to the current block.

$$v_{0x}=v_{3x}+(v_{5x}-v_{3x})(y_0-y_3)/nH+(v_{4x}-v_{3x})(x_0-x_3)/nW$$

$$v_{0y}=v_{3y}+(v_{5y}-v_{3y})(y_0-y_3)/nH+(v_{4y}-v_{3y})(x_0-x_3)/nW$$

$$v_{1x}=v_{0x}+(v_{4x}-v_{3x})\times cW/nW$$

$$v_{1y}=v_{0y}+(v_{4y}-v_{3y})\times cH/nH$$

$$v_{2x}=v_{0x}+(v_{5x}-v_{3x})\times cW/nW$$

Figure 7:
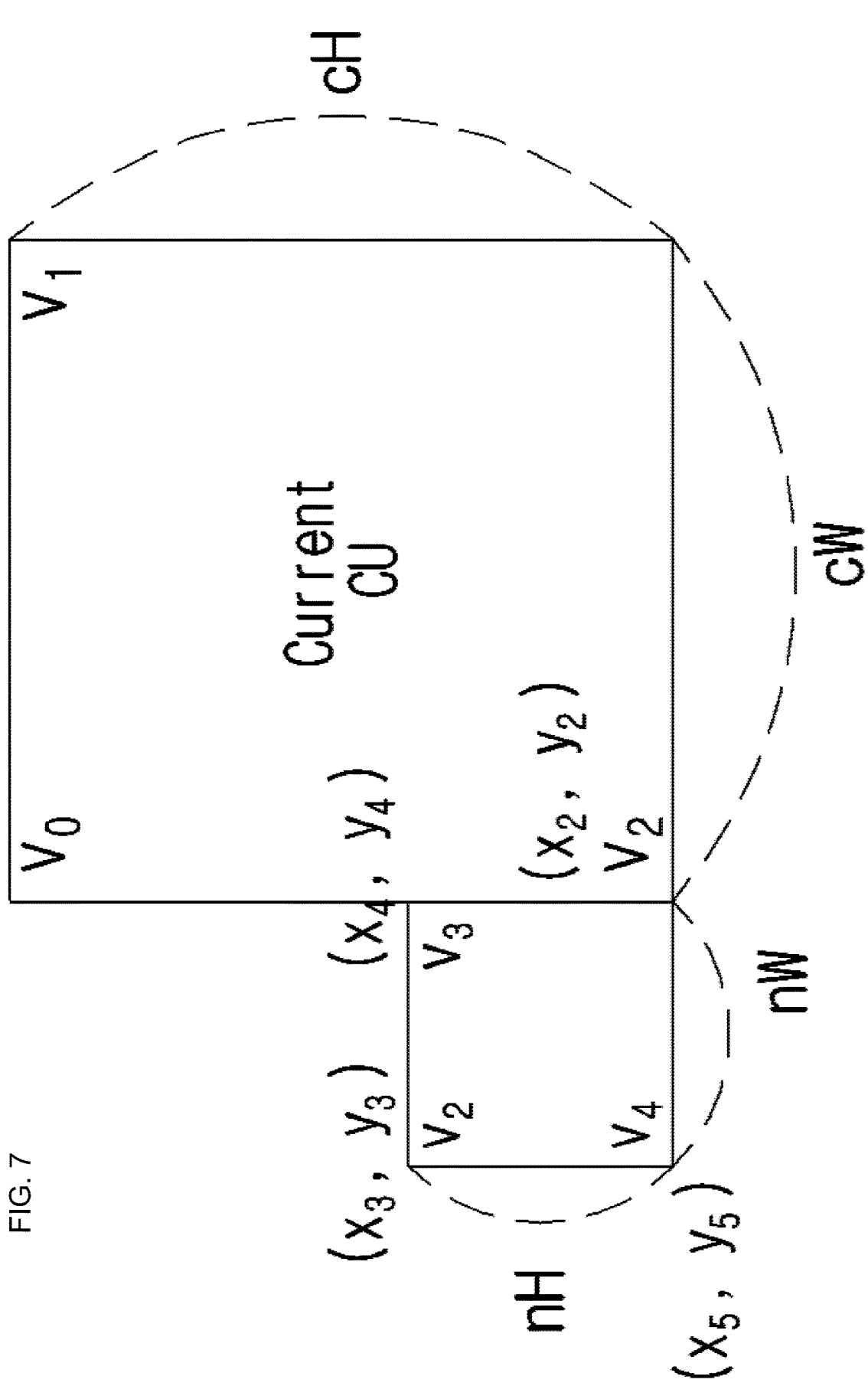

For example, as shown in Equation 1, the top-left (x0, y0), top-right (x1, y1) or bottom-left (x2, y2) CPMVs of the current block may be derived using CPMV including the top-left (x3, y3), top-right (x4, y4), or bottom-left (x5, y5) of the left block as shown in FIG. 7. Motion information in units of sub-blocks may be derived by applying the CPMVs of the current block to an affine model. However, it is not limited to the left block, and at least one of the top block, the top-left block, the bottom-left block, and the top-right block may be used. CPMV may be derived using a bottom-right position (not shown) of the neighboring block. The bottom-right position may be selectively used in consideration of a position of the current block, an availability of a neighboring block, an availability of the top-left, top-right or bottom-left position of the neighboring block. Here, the position of the current block may mean whether it is located on a boundary of a predetermined segment region, and the segment region may mean a tile, a slice, a coding tree block (CTB row, CBT, etc.). The number of available neighboring blocks when deriving CPMV may be 1, 2, 3 or more. The number may be a number pre-defined in the encoder/decoder, may be the same number regardless of the corner position of the current block, or may be defined differently for each corner position.

The ATMVP may receive one or more motion information from spatial neighboring blocks in a predetermined order and derive inter prediction information in units of sub-blocks for the current block.

Motion information initially existing from the spatial neighboring blocks may be used as motion information in units of sub-blocks of the current block. The motion information may be motion information existing in units of sub-blocks in a block corresponding to the current block in a picture on which encoding/decoding has been previously performed.

Figure 6:
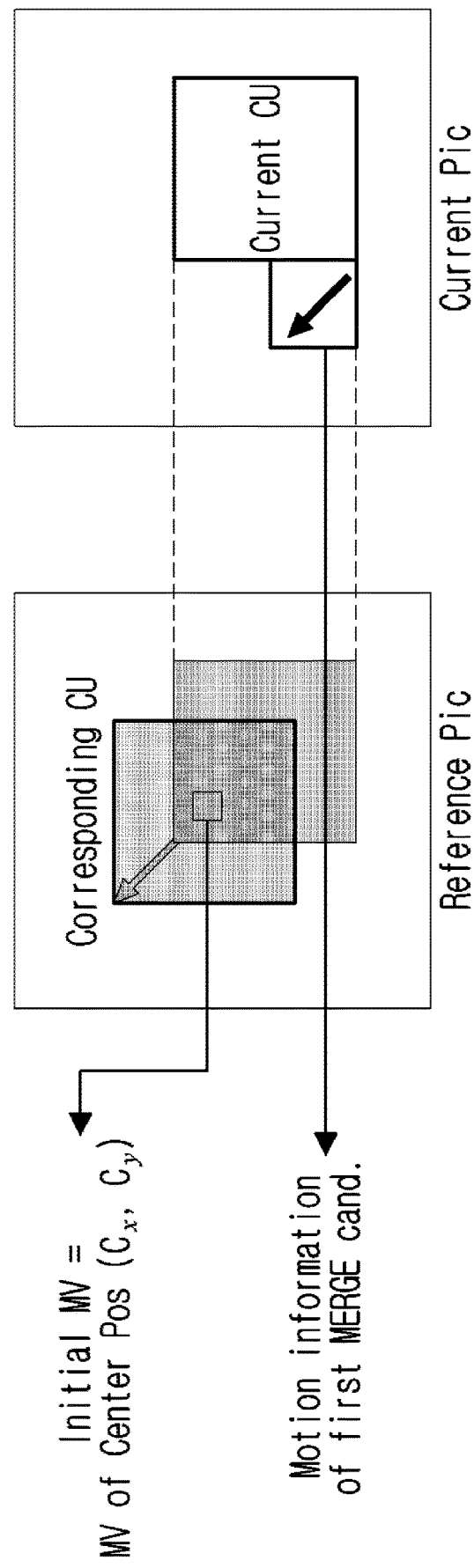

When there is no motion information for a sub-block unit of a reference block, as shown in FIG. 6, a sub-block of the current block may be replaced with motion information of a sub-block existing at an intermediate position of the previous picture.

The affine may derive sub-block unit motion vectors (CPMV) of the current block using motion vectors (CPMV) of sub-blocks existing in a neighboring block. The motion information in units of sub-blocks for the current block may be derived by using the derived CPMV.

For example, the top-left and top-right CPMVs of the current block may be generated by using the top-left and top-right CPMVs of the neighboring blocks of FIG. 7.

For example, the top-left, top-right, and bottom-left CPMVs of the current block may be generated by using the top-left, bottom-left, and top-right CPMVs of the neighboring block of FIG. 7.

Motion information of neighboring blocks adjacent to the top-left, top-right, or bottom-left of the current block may be used as CPMV. By using the CPMVs, motion information in units of sub-blocks of the current block may be derived.

For example, motion information in units of sub-blocks of the current block may be derived by using motion information existing in each position {A, B, C}, position {D,E}, and position {F,G} as CPMV.

The STMVP may be derived for the current block by combining inter prediction information in units of sub-blocks of a spatial neighboring block and a temporal neighboring block. The combination may be performed based on an operation such as a median value, an average value, and a minimum/maximum value.

Motion information of a sub-block previously derived in the current block may be used for deriving motion information of current sub-block.

The HMVP may be used to derive motion information of a current block by constructing motion information of previously coded blocks as candidates.

Figure 8:
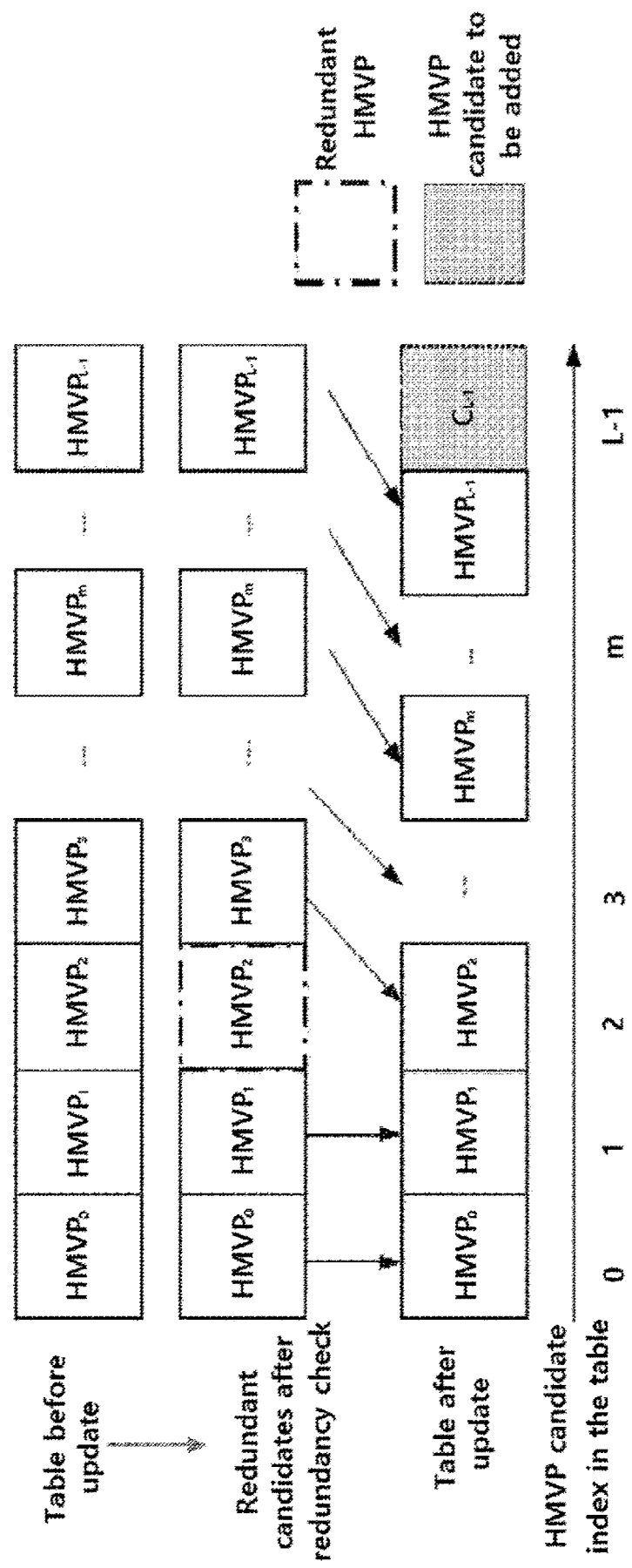

As shown in FIG. 8, a first candidate list may be constructed by storing motion information of previously coded blocks. In constructing the inter prediction candidate list of the current block, one or more motion information of the first candidate list may be used. The first candidate list may be constructed with motion information of A previously coded blocks. Here, the A may be 1, 2, 3, 4, 5, 6 or more natural numbers. The A may be less than or equal to a threshold value pre-promised to the encoder/decoder. The previously coded block may include a block that is not adjacent to the current block. The A may be determined based on information signaled by the encoder (e.g., number information specifying a value), or may be a fixed value pre-promised to the encoder/decoder.

For example, motion information of the first candidate list may be used for a merge candidate list. For example, motion information of the first candidate list may be used for an AMVP candidate list.

After the inter prediction mode of the current block is finally determined, the prediction mode may be added to the first candidate list.

When the inter prediction mode of the current block is determined as the merge mode, the merge candidate list may be constructed. The merge candidate list may be constructed with N inter prediction information.

The merge candidate list may be constructed using at least one of inter prediction information of a spatial neighboring block, inter prediction information of a temporal neighboring block, HMVP, synthetic inter prediction information, STMVP, ATMVP, and zero motion information.

The list may be constructed with the N candidates, the N, for example, being 5 or more.

Figure 9:
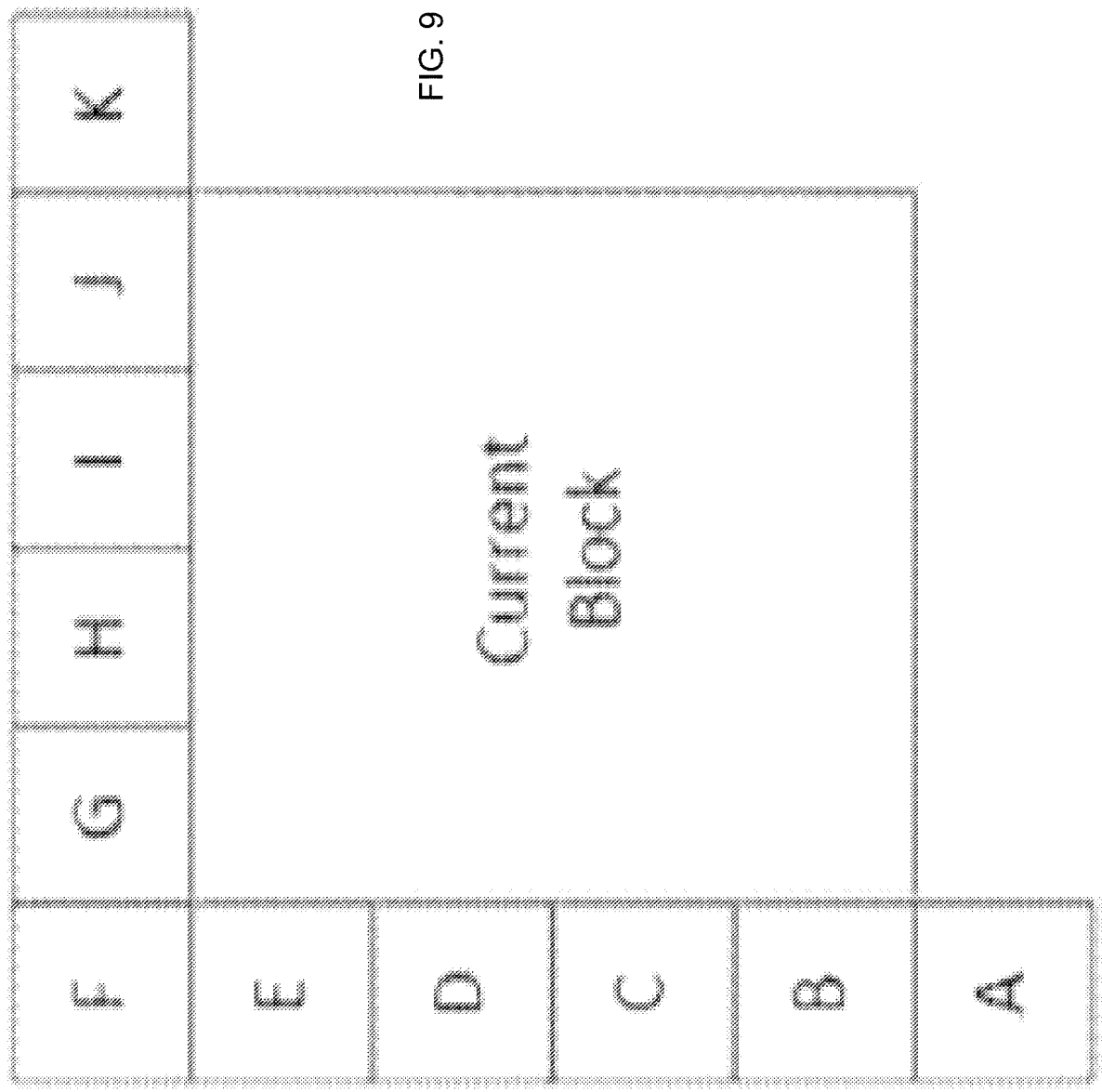

Inter prediction information of a spatial neighboring block means inter prediction information of a block existing at position A, B, . . . , J, K in FIG. 9. In this case, a size of the neighboring block may have a size of M×N, and M or N may be at least one of 4, 8, 16, 32, 64, and 128, respectively. The size may be a pre-promised fixed value or may be variably determined by the above-described coding parameter.

For example, when deriving motion information of a neighboring block, it may be derived in the order of blocks at B, J, K, A, and F in FIG. 9.

Inter prediction information of a temporal neighboring block means inter prediction information existing in a block of a picture that has been encoded/decoded before position of at least one of a, b, c, d, e, f, g, h.

HMVP is the same as described above, and a detailed description thereof will be omitted.

ATMVP may use inter prediction information in units of sub-blocks of a corresponding block to the current block in a picture that has been previously encoded/decoded. In order to find the corresponding block, first existing motion information among spatial neighboring blocks according to a predetermined order may be used.

For example, when deriving motion information of a neighboring block, a search is performed in the order of blocks at B, J, K, A in FIG. 9, and motion information of a neighboring block which has first existing motion information exists may be used.

For example, motion information of a first candidate in a block unit merge candidate list derived through a spatial neighboring block may be used.

STMVP means sub-block unit inter prediction information generated by combining inter prediction information of a spatial neighboring block or a temporal neighboring block in units of sub-blocks for the current block.

Synthetic inter prediction information may be derived by combining one or more of the candidates existing in the merge candidate list. The motion vector of the synthetic inter prediction information may be obtained by combining N positive integer motion vectors.

The combined inter prediction information may be derived by using at least one of merge candidates existing in the merge candidate list, and is hereinafter referred to as a combined merge candidate.

The merge candidate list may further include the combined merge candidate. The combined merge candidate may be derived by combining n merge candidates belonging to a pre-generated merge candidate list.

Here, the n may be an integer of 2, 3, 4 or more. The number (n) of merge candidates to be combined may be a fixed value pre-promised to an encoding/decoding apparatus, or may be encoded and signaled by the encoding apparatus. The signaling may be performed in at least one unit of a sequence, a picture, a slice, a tile, a sub-tile (brick), or a predetermined block. The number (n) of merge candidates to be combined may be variably determined based on the number of remaining merge candidates. Here, the number of remaining merge candidates may mean a difference between a maximum number of merge candidates that can be included in the merge candidate list and a current number of merge candidates in the merge candidate list. The maximum number may be a number pre-promised to the encoding/decoding apparatus, or may be encoded and signaled by the encoding apparatus. The current number may mean the number of merge candidates constructed before adding the combined merge candidate. For example, when the number of remaining merge candidates is 1, two merge candidates may be used, and when the number of remaining merge candidates is greater than 1, three or more merge candidates may be used.

The positions of the n merge candidates may be predetermined positions in the merge candidate list. For example, indexes (0 to (k−1)) may be allocated for each merge candidate belonging to the merge candidate list. Here, k may mean the total number of merge candidates belonging to the merge candidate list. In this case, the positions of n merge candidates may correspond to index 0 to index (n−1) in the merge candidate list. Alternatively, the n merge candidates may be determined in consideration of a prediction direction of each merge candidate belonging to the merge candidate list. For example, among merge candidates belonging to the merge candidate list, only a merge candidate that is bi-directional prediction may be selectively used, or only a merge candidate that is uni-directional prediction may be selectively used.

The combined merge candidate may be derived using both a spatial merge candidate and a temporal merge candidate, or may be derived using only one of a spatial merge candidate or a temporal merge candidate. For example, the combined merge candidate may be restricted to be derived using only the spatial merge candidate. In this case, the number of merge candidates to be combined may be restricted within the number of spatial merge candidates belonging to a pre-generated merge candidate list.

The combined merge candidate may be added after the spatial/temporal merge candidate in the merge candidate list. That is, an index of the combined merge candidate may be larger than an index of the spatial/temporal merge candidate. Alternatively, the combined merge candidate may be added between the spatial merge candidate and the temporal merge candidate in the merge candidate list. That is, the index of the combined merge candidate may be greater than the index of the spatial merge candidate and may be smaller than the index of the temporal merge candidate. Alternatively, a position of the combined merge candidate may be variably determined in consideration of the prediction direction of the combined merge candidate. Depending on whether the prediction direction of the combined merge candidate is bi-directional prediction, the position of the combined merge candidate in the merge candidate list may be rearranged. For example, when the combined merge candidate is bi-directional prediction, an index smaller than the spatial or temporal merge candidate may be allocated, and otherwise, an index larger than the spatial or temporal merge candidate may be allocated.

Hereinafter, for convenience of description, a method of deriving the combined merge candidate based on two merge candidates will be described.

Motion information of the combined merge candidate may be derived by weighted average of motion information of a first merge candidate and a second merge candidate. Here, a weight of the weighted average is [1:1], [1:2], [1:3], [2:3], etc., but is not limited thereto. The weight may be pre-defined in the encoding/decoding apparatus or derived from the decoding derived. In this case, the weight may be derived by considering at least one of a distance between a current picture and a reference picture of the merge candidate, or a prediction direction of the merge candidate. Alternatively, motion information of the combined merge candidate may be derived by obtaining motion information in an L0 direction from the first merge candidate and motion information in an L1 direction from the second merge candidate, and combining them. Motion information of the combined merge candidate may be derived based on at least one of the above-described derivation methods, and this may be performed in consideration of the prediction direction of the merge candidate to be combined, as described later.

In this specification, the motion information may include at least one of a prediction direction flag, a reference picture index, or a motion vector. The motion information may be defined for L0 prediction and L1 prediction, respectively. Here, the L0 prediction may mean prediction referring to a reference picture list L0, and L1 prediction may mean prediction referring to a reference picture list L1.

1. When both the first merge candidate and the second merge candidate are uni-directional prediction (CASE 1) When the first merge candidate is L0 prediction and the second merge candidate is L1 prediction, the reference picture index of the combined merge candidate in the L0 direction may be derived using a reference picture index of the first merge candidate. The prediction direction flag in the L0 direction of the combined merge candidate may be derived as 1. The motion vector of in the L0 direction the combined merge candidate may be derived as a motion vector of the first merge candidate. The reference picture index in the L1 direction of the combined merge candidate may be derived as the reference picture index of the second merge candidate. The prediction direction flag in the L1 direction of the combined merge candidate may be derived as 1. The motion vector of the combined merge candidate in the L1 direction may be derived as a motion vector of the second merge candidate.

(CASE 2) When the first merge candidate is L1 prediction and the second merge candidate is L0 prediction, the reference picture index in the L0 direction of the combined merge candidate may be derived as the reference picture index of the second merge candidate. The prediction direction flag in the L0 direction of the combined merge candidate may be derived as 1. The motion vector of in the L0 direction the combined merge candidate may be derived as the motion vector of the second merge candidate. The reference picture index in the L1 direction of the combined merge candidate may be derived as the reference picture index of the first merge candidate. The prediction direction flag in the L1 direction of the combined merge candidate may be derived as 1. The motion vector in the L1 direction of the combined merge candidate may be derived as the motion vector of the first merge candidate.

(CASE 3) When the first merge candidate and the second merge candidate are L0 prediction, the reference picture index in the L0 direction of the combined merge candidate may be derived as reference picture index of any one of the first merge candidate or the second merge candidate. For example, a reference picture index of a merge candidate having a smallest index among the first merge candidate and the second merge candidate may be set as the reference picture index in the L0 direction of the combined merge candidate. The prediction direction flag in the L0 direction of the combined merge candidate may be derived as 1. The motion vector in the L0 direction of the combined merge candidate may be derived from a weighted average of the motion vector of the first merge candidate and the second merge candidate. The reference picture index in the L1 direction of the combined merge candidate may be derived as −1, the prediction direction flag in the L1 direction may be derived as 0, and the motion information in the L1 direction may be derived as 0.

(CASE 4) When the first merge candidate and the second merge candidate are L1 prediction, the reference picture index in the L0 direction of the combined merge candidate is derived as −1, the prediction direction flag in the L0 direction is derived as 0, and the motion information in the L0 direction may be derived as 0. The reference picture index in the L1 direction of the combined merge candidate may be derived as a reference picture index any one of the first merge candidate or the second merge candidate. For example, a reference picture index of a merge candidate having the smallest index among the first merge candidate and the second merge candidate may be set as the reference picture index in the L1 direction of the combined merge candidate. The prediction direction flag in the L1 direction of the combined merge candidate may be derived as 1. The motion vector in the L1 direction of the combined merge candidate may be derived from a weighted average of the motion vector of the first merge candidate and the second merge candidate.

2. When both the first merge candidate and the second merge candidate are bi-directional prediction (CASE 5) The reference picture index in the L0 direction of the combined merge candidate may be derived as a reference picture index of any one of the first merge candidate or the second merge candidate. For example, a reference picture index of a merge candidate having a smallest index among the first merge candidate and the second merge candidate may be set as the reference picture index in the L0 direction of the combined merge candidate. The prediction direction flag in the L0 direction of the combined merge candidate may be derived as 1. The motion vector in the L0 direction of the combined merge candidate may be derived from a weighted average of the motion vector of the first merge candidate and the second merge candidate. The reference picture index in the L1 direction of the combined merge candidate may be derived as a reference picture index of any one of the first merge candidate or the second merge candidate. For example, a reference picture index of a merge candidate having the smallest index among the first merge candidate and the second merge candidate may be set as the reference picture index in the L1 direction of the combined merge candidate. The prediction direction flag in the L1 direction of the combined merge candidate may be derived as 1. The motion vector in the L1 direction of the combined merge candidate may be derived from a weighted average of the motion vector of the first merge candidate and the second merge candidate.

3. When the first merge candidate is bi-directional prediction and the second merge candidate is uni-directional prediction (CASE 6) When the second merge candidate is L0 prediction, the reference picture index in the L0 direction of the combined merge candidate may be derived as a reference picture index of any one of the first merge candidate or the second merge candidate. For example, a reference picture index of a merge candidate having a smallest index among the first merge candidate and the second merge candidate may be set as the reference picture index in the L0 direction of the combined merge candidate. The prediction direction flag in the L0 direction of the combined merge candidate may be derived as 1. The motion vector in the L0 direction of the combined merge candidate may be derived from a weighted average of the motion vector of the first merge candidate and the second merge candidate. The reference picture index in the L1 direction of the combined merge candidate may be derived as the reference picture index of the first merge candidate. The prediction direction flag in the L1 direction of the combined merge candidate may be derived as 1. The motion vector in the L1 direction of the combined merge candidate may be derived as the motion vector of the first merge candidate.

(CASE 7) When the second merge candidate is L1 prediction, the reference picture index in the L0 direction of the combined merge candidate may be derived as the reference picture index of the first merge candidate. The prediction direction flag in the L0 direction of the combined merge candidate may be derived as 1. The motion vector in the L0 direction of the combined merge candidate may be derived as the motion vector of the first merge candidate. The reference picture index in the L1 direction of the combined merge candidate may be derived as a reference picture index of any one of the first merge candidate or the second merge candidate. For example, a reference picture index of a merge candidate having the smallest index among the first merge candidate and the second merge candidate may be set as the reference picture index in the L1 direction of the combined merge candidate. The prediction direction flag in the L1 direction of the combined merge candidate may be derived as 1. The motion vector in the L1 direction of the combined merge candidate may be derived from a weighted average of the motion vector of the first merge candidate and the second merge candidate.

When the (maximum) candidate list of the merge mode is not filled, the (maximum) candidate list may be filled with the zero motion information.

When the inter prediction mode of the current block is determined as the skip mode, a skip candidate list may be constructed. The skip candidate list may consist of N inter prediction information.

In the case of the skip mode, the candidate list construction method may be the same as the merge candidate list construction method.

When the inter prediction mode of the current block is determined as the AMVP mode, an AMVP candidate list may be constructed. The AMVP candidate list may consist of N inter prediction information.

The AMVP candidate list having at least one of a motion vector, a reference picture list, a reference direction, or a motion vector difference is constructed. The AMVP candidate list includes at least one of inter prediction information of a spatial neighboring block, inter prediction information of a temporal neighboring block, and zero motion information.

For example, the AMVP candidate list may be constructed two or two or more lists.

Inter prediction information of spatial neighboring blocks means inter prediction information of a block at positions of A, B, . . . , J, K in FIG. 9. One or more candidates may be derived from the spatial neighboring blocks in a predetermined order.

A left neighboring block may be a block at one or more positions of A, B, C, D, E, and the inter prediction information may be derived in a predetermined order.

For example, when deriving motion information of the left neighboring block, it may be derived in the order of blocks at A and B in FIG. 9. Alternatively, it may be derived in the order of blocks at B and A.

A top neighboring block may be a block at one or more positions among F, G, H, I, J, and K, and the inter prediction information may be derived in a predetermined order.

For example, when deriving motion information of the top neighboring block, it may be derived in the order of blocks at of K, J, F in FIG. 9. Alternatively, it may be derived in the order of blocks at J, K, F or F, J, K.

In deriving according to the predetermined order, when motion information of a neighboring block corresponding to a current order is not available, motion information of a block corresponding to the next order may be used.

Figure 10:
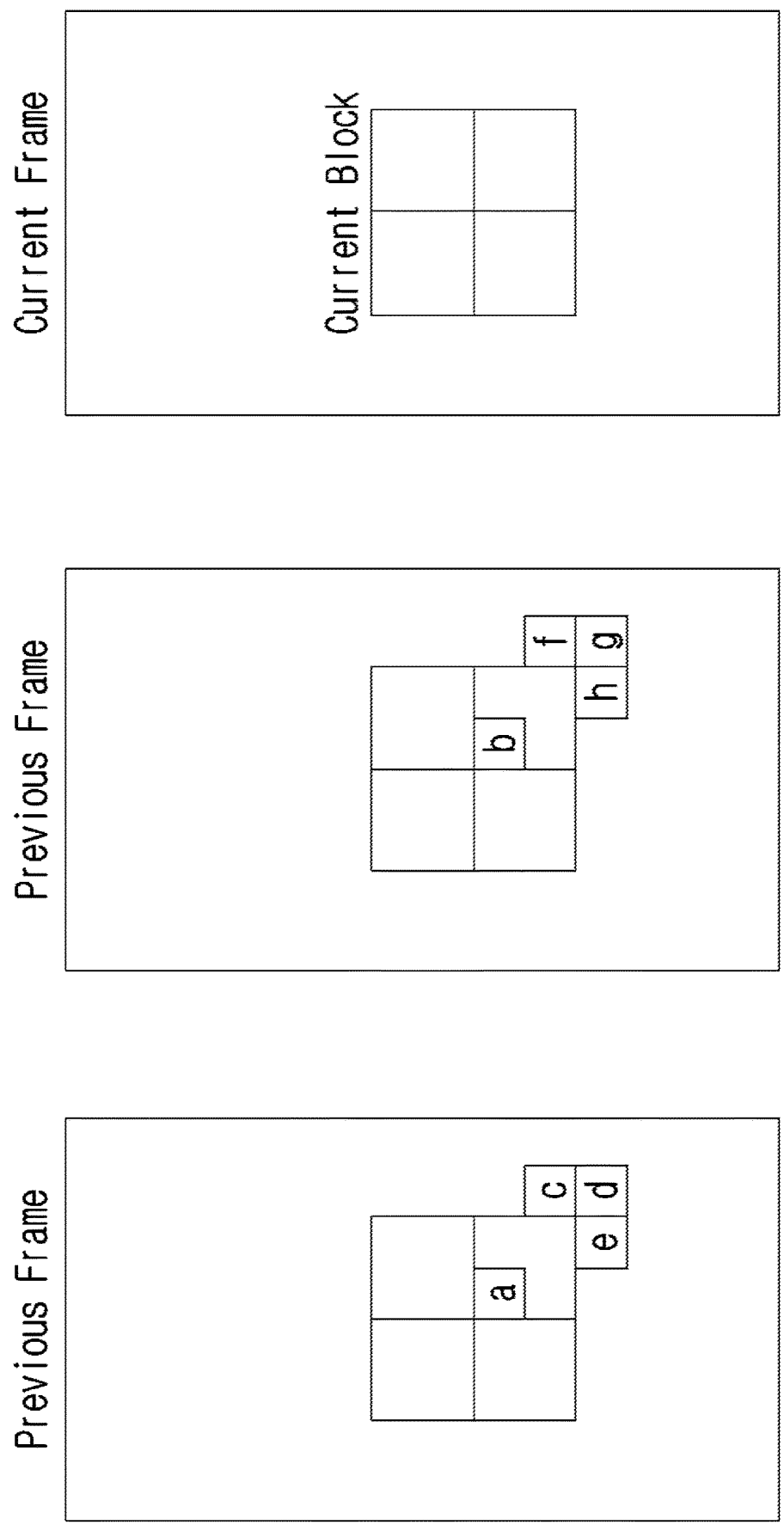

The inter prediction information of a temporal neighboring block means inter prediction information that exists in a block at the same position as a current block in a picture that has been encoded/decoded before a current picture in FIG. 10. The position of the temporal neighboring block may correspond to a position at least one of a bottom-right, center, and predetermined position of the current block.

For example, the position of the temporal neighboring block may correspond to a position at a or b of a block existing in a previous picture.

For example, the position of the temporal neighboring block may correspond to one of positions c, d, e of a block existing in the previous picture, or one of positions f, g, h of a block existing in another previous picture. Alternatively, the temporal neighboring block may include a top-left position (not shown) of a block corresponding to the current block, or may be a block adjacent to the top-left position.

When the (maximum) candidate list of the AMVP mode is not filled, the candidate list may be filled with the zero motion information.

When the inter prediction mode of the current block is determined as the sub-block unit merge mode, a merge candidate list may be constructed in units of sub-blocks. The sub-block unit merge candidate list may consist of N inter prediction information.

The sub-block unit merge candidate list may be constructed using at least one of ATMVP, inherited affine inter prediction information, combined affine inter prediction information, and zero affine motion prediction information.

The ATMVP may use inter prediction information in units of sub-blocks of a corresponding block to the current block in a picture that has been previously encoded/decoded. In order to find the corresponding block, motion information first existing from a spatial neighboring block may be used in a predetermined order.

Figure 11:
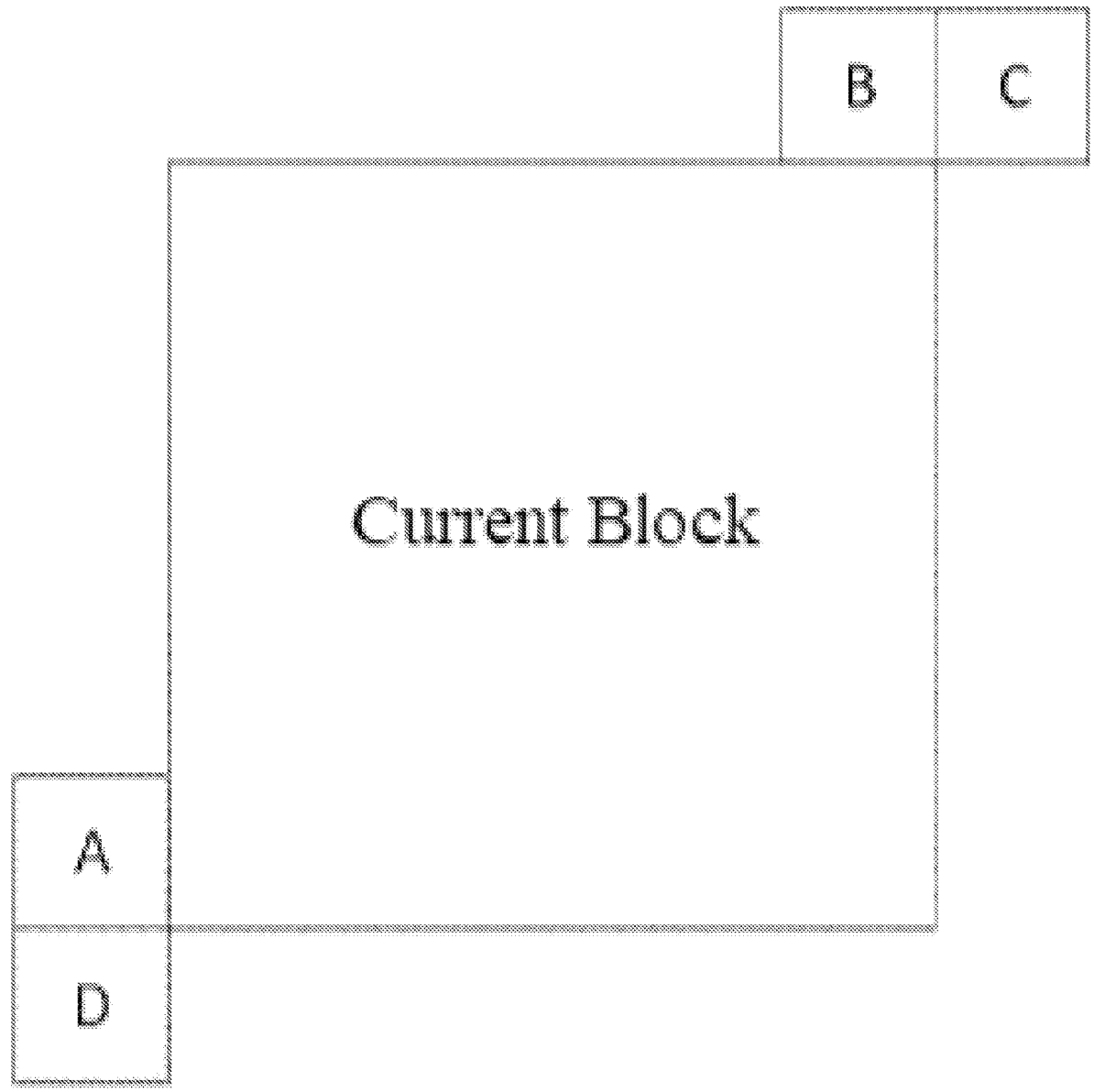

For example, the corresponding block to the current block may be found by searching in the order of blocks at A, B, C, D in FIG. 11.

For example, when there is no motion information in all neighboring blocks, the corresponding block may be found using zero motion information.

Figure 12:
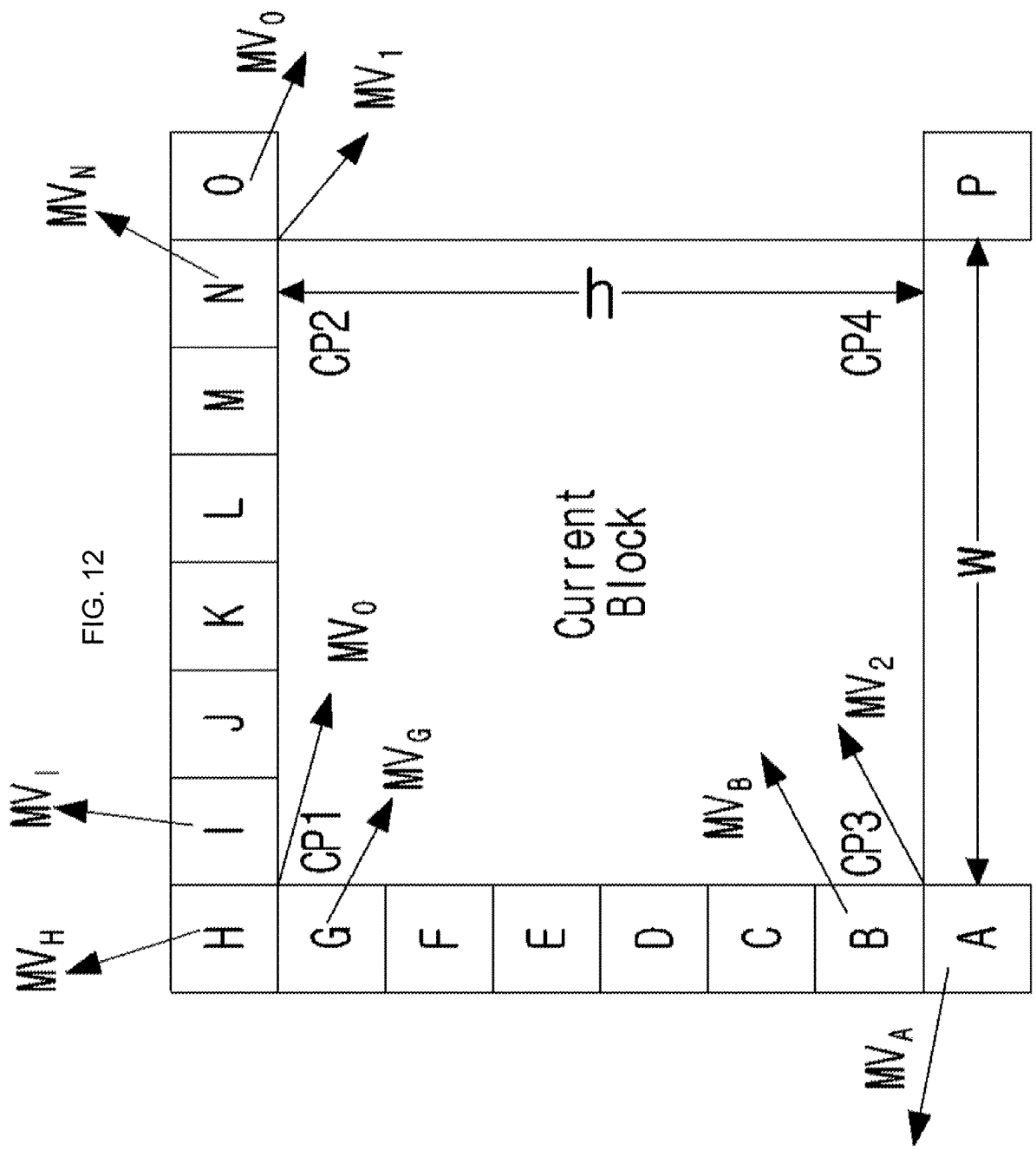

The inherited affine inter prediction information may be a CPMV derived from a CPMV of a spatial neighboring block encoded/decoded with affine to the current block. The CPMV of the spatial neighboring block may be a sub-block unit motion vector of positions at least one of a top-left, top-right, bottom-left, or bottom-right of blocks encoded/decoded with affine, and the sub-block unit motion vector (CPMV of the current block) of positions at the top-left, top-right, or bottom-left of the current block may be derived through scaling the CPMV of the neighboring block according to the width and height of the current block and the neighboring block, as shown in Equation 1. In FIG. 12, spatial neighboring blocks at positions A, B, . . . , H, O may be searched, and one or more candidates consisting of one or at least two or more CPMV combinations (4-parameter, 6-parameter, . . . ) derived in a predetermined order may be derived.

The 4-parameter may be a sub-block unit motion vector combination derived at two positions among four corners of the current block. In this case, any two of the top-left, top-right, bottom-left and bottom-right of the current block may be selectively used. However, if any one of the selected corner positions is not available, it may be replaced with another available corner position. For example, the combination of the two CPMVs (4-parameter) may be a sub-block-unit motion vector combination derived at the top-left and top-right of the current block.

The 6-parameter may be a sub-block unit motion vector combination derived at three positions among four corners of the current block. In this case, any three of the top-left, top-right, bottom-left, and bottom-right of the current block may be selectively used. However, if any one of the selected corner positions is not available, it may be replaced with another available corner position. For example, the three CPMV combinations (6-parameters) may be sub-block unit motion vector combinations derived at the top-left, top-right, and bottom-left of the current block.

The left neighboring blocks may be blocks at A, B, C, . . . , F, G, and at least one or more inter prediction information may be derived in a predetermined order.

For example, at least one or more inter prediction information may be derived in the order of blocks at A and B in FIG. 12.

The top neighboring blocks may be blocks at H, I, J, . . . , N, O, and at least one or more inter prediction information may be derived in a predetermined order.

For example, at least one or more inter prediction information may be derived in the order of blocks at O, N, and H in FIG. 12. The above-described order is only an example, and may be derived in the reverse order.

The combined affine inter prediction information may be a motion vector combination of neighboring blocks adjacent to the top-left (CP1), top-right (CP2), bottom-left (CP3), and bottom-right (CP4) positions in FIG. 12. The motion vector of the neighboring block may be used as CPMV. A candidate composed of at least two or more CPMV combinations (4-parameter, 6-parameter, . . . ) may be constructed. When all motion vectors of neighboring blocks used as the CPMV combination have the same reference index, they may be added to the candidate list. When the neighboring blocks have the same reference picture, they may be added to the candidate list.

For example, a motion vector that first exists among positions of H, I, G in FIG. 12 may be used as CP1, which is the top-left CPMV. In this case, the search order may be (H, I, G), (H, G, I), (G, I, H), (I, G, H), (G, H, I) or (I, H, G).

For example, a motion vector that first exists among positions of N, O in FIG. 12 may be used as CP2, which is the top-right CPMV. In this case, the search order may be (N, O) or (O, N).

For example, a motion vector that first exists among positions B and A of FIG. 12 may be used as CP3, which is the bottom-left CPMV. In this case, the search order may be (B, A) or (A, B).

For example, a motion vector existing at a position P of a reference block of a previous picture in FIG. 12 may be used as CP4, which is the bottom-right CPMV.

For example, the four CPMVs (CP1, CP2, CP3, CP4) may be combined in the order of {CP1, CP2, CP3}, {CP1, CP2, CP4}, {CP1, CP3, CP4}, {CP2, CP3, CP4}, {CP1, CP2}, {CP1, CP3}, and when all corresponding CPs have the same reference index (or have the same reference picture), they may be added to the candidate list.

When the maximum candidate list in the sub-block unit merge mode is not filled, the candidate list may be filled with zero motion information.

When the inter prediction mode of the current block is determined as the sub-block unit skip mode, a skip candidate list may be constructed in units of sub-blocks. The skip candidate list in units of sub-blocks may consist of N inter prediction information.

Details about constructing the candidate list may be the same as the contents of the sub-block unit merge mode.

When the inter prediction mode is determined as the sub-block unit merge mode or the sub-block unit skip mode, the inter prediction mode may be derived by using the CPMV of the affine model existing in the candidate list of the sub-block unit inter prediction mode. In order to use the CPMV of the affine model existing in the candidate list, ATMVP may be filled in the candidate list after affine model prediction.

For example, the ATMVP may be filled in the candidate list after the combined affine inter prediction information.

For example, the ATMVP may be filled in the candidate list after the inherited affine inter prediction information.

At least one or more of the CPMVs of the inherited affine inter prediction candidates may be used to derive sub-block unit motion information of the current block for ATMVP.

The left neighboring blocks may be a block at one or more positions among A, B, C, . . . , F, G, and the inter prediction information may be derived in a predetermined order.

For example, at least one or more inherited affine inter prediction information among blocks at A and B in FIG. 12 may be derived. At least one or more of the CPMVs at the top-left, top-right, or bottom-left of the corresponding block may be used to derive motion information in units of sub-blocks.

The top neighboring blocks may be a block at one or more positions among H, I, J, . . . , N, O, and the sub-block prediction information may be derived in a predetermined order.

For example, at least one or more inherited affine inter prediction information among blocks at O, N, and H in FIG. 12 may be derived. At least one of the CPMVs at the top-left, top-right, or bottom-left position of the corresponding block may be used to derive motion information in units of sub-blocks of the current block.

At least one or more of the CPMVs of the combined affine inter prediction information may be used to derive sub-block unit motion information for the ATMVP. The sub-block unit motion information may be motion information existing in units of sub-blocks of a block corresponding to the current block moved by the CPMV in a picture that has been previously encoded/decoded.

For example, the top-left CP1 may be used to derive motion information in units of sub-blocks of the current block.

For example, the top-right CP2 may be used to derive motion information in units of sub-blocks of the current block.

For example, the bottom-left CP3 may be used to derive motion information in units of sub-blocks of the current block.

When the inter prediction mode is determined as a sub-block unit merge mode or a sub-block unit skip mode, one and the same search order for neighboring blocks may be constructed to construct a candidate list of the sub-block unit inter prediction mode. It may be used to derive the ATMVP, the inherited affine inter prediction information, and the combined affine inter prediction information by determining whether motion information of neighboring blocks is available according to the same constructed search order.

The search order of left neighboring blocks or top neighboring blocks may be identically constructed. By determining whether motion information is available, at least one or more blocks from the left block and at least one or more blocks from the top block may be used to derive sub-block unit inter candidates.

For example, the left neighboring blocks may be blocks at A, B, C, . . . , F, G in FIG. 12, and at least one or more blocks may be used to derive sub-block inter prediction information by constructing the search order as in the order of blocks at A, B, G or A, B in FIG. 12.

For example, the top neighboring blocks may be blocks at one or more positions of H, I, J, . . . , N, O, and at least one or more blocks may be used to derive sub-block inter prediction information by constructing the search order as in the order of blocks at O, N, I, H or O, N, H in FIG. 12.

The bottom-left, top-right, and top-left neighboring blocks may be searched in the same order. By determining whether motion information is available, at least one or more blocks from the top-left blocks, at least one or more blocks from the top-right blocks, and at least one or more blocks from the bottom-left blocks may be used to derive sub-block unit inter candidates.

For example, the bottom-left neighboring blocks may be blocks at A, . . . , D, and at least one or more blocks may be used to derive sub-block inter prediction information by constructing the search order as in the order of blocks at A, B, C, D or A, B, C, or A, B in FIG. 12.

For example, the top-right neighboring blocks may be blocks at L, . . . , O, and at least one or more blocks may be used to derive sub-block inter prediction information by constructing the search order as in the order of blocks at O, N, M, L, or O, N, M in FIG. 12.

For example, the top-left neighboring blocks may be blocks F, G, . . . , I, J, and at least one or more blocks may be used to derive sub-block inter prediction information by constructing the search order as in the order of blocks at H, I, G, J, F or H, I, G in FIG. 12.

When the inter prediction mode of the current block is determined as the sub-block unit AMVP mode, an AMVP candidate list may be constructed in units of sub-blocks. The AMVP candidate list in units of sub-blocks may consist of N inter prediction information.

The sub-block unit AMVP candidate list includes at least one or more of the inherited affine inter prediction information, combined affine inter prediction information, padding affine inter prediction information, and zero affine inter prediction information.

The inherited affine inter prediction information may be a motion vector of a spatial neighboring block encoded/decoded with an affine, and may be a CPMVP derived from a CPMV to the current block through scaling the CPMV of the neighboring block according to the width and height of the current block and the neighboring block, as shown in Equation 1. The CPMV of the spatial neighboring block may be a sub-block unit motion vector of at least one of the top-left, top-right, bottom-left, or bottom-right of the blocks encoded/decoded with affine, and the sub-block unit motion vector (CPMVP of the current block) at the top-left, top-right, or bottom-left of the current block may be derived through scaling the CPMV of the neighboring block according to the width and height of the current block and the neighboring block, as shown in Equation 1. In FIG. 12, spatial neighboring blocks at A, B, . . . , H, O may be searched, and one or more candidates consisting of at least two or more CPMVP combinations (4-parameter, 6-parameter, . . . ) derived according to a predetermined order may be derived. CPMV may be obtained through additional search for the CPMVP, and a difference value between CPMV and CPMVP may be additionally signaled.

For example, the combination of the two CPMVPs (4-parameter) may be a sub-block unit motion vector combination derived at the top-left, top-right of the current block.

For example, the combination of the three CPMVP (6-parameters) may be a sub-block unit motion vector combination derived at the top-left, top-right, bottom-left of the current block.

The left neighboring blocks may be blocks at A, B, C, . . . , F, G, and at least one or more inter prediction information may be derived in a predetermined order.

For example, at least one or more inter prediction information may be derived in the order of blocks at A, B in FIG. 12.

The top neighboring blocks may be blocks at H, I, J, . . . N, O, and at least one or more inter prediction information may be derived in a predetermined order.

For example, at least one or more inter prediction information may be derived in the order of blocks at O, N, H in FIG. 12.

The combined affine inter prediction information may be a motion vector combination of neighboring blocks adjacent to the top-left (CP1), top-right (CP2), and bottom-left (CP3) in FIG. 12. The motion vector of the neighboring block may be used as CPMVP. A candidate composed of at least two or more CPMV combinations (4-parameter, 6-parameter, . . . ) may be constructed, and when all the CPMVPs exist and all have the same reference index, they may be added to the candidate list, and may be added as a candidate.

For example, a motion vector existing at H, I, G in FIG. 12 may be used as CP1, which is the top-left CPMVP.

For example, a motion vector existing at N, O in FIG. 12 may be used as CP2, which is the top-right CPMVP.

For example, a motion vector existing at B, A in FIG. 12 may be used as CP3, which is the bottom-left CPMVP.

For example, in the case of a 4-parameter combined affine, motion vectors of the top-left (CP1) and top-right (CP2) may be used as a CPMVP combination.

For example, in the case of a 6-parameter combination affine, motion vectors of the top-left (CP1), top-right (CP2), and bottom-left (CP3) may be used as a CPMVP combination.

When a maximum candidate list of the sub-block unit AMVP mode is not filled, the candidate list may be filled with CPMVP used for combined affine inter prediction information as padding affine motion information.

For example, the motion vector CP1 at the top-left position may be stored as CPMVP at the top-left, top-right, and bottom-left, and configured as candidates.

For example, the motion vector CP2 at the top-right position may be stored as CPMVP at the top-left, top-right, and bottom-left, and configured as candidates.

For example, the motion vector CP3 at the bottom-left position may be stored as CPMVP at the top-left, top-right, and bottom-left, and configured as candidates.

When the maximum candidate list of the sub-block unit AMVP mode is not filled, the candidate list may be filled with zero motion information.

When the inter prediction mode is determined as the sub-block unit AMVP mode, one and the same search order for neighboring blocks may be constructed to construct a candidate list of the sub-block unit inter prediction mode. It may be used to derive the ATMVP, the inherited affine inter prediction information, and the combined affine inter prediction information by determining whether motion information of neighboring blocks is available according to the same constructed search order.

The search order of the left neighboring blocks and the top neighboring blocks may be constructed in the same manner. By determining whether motion information is available, at least one block from the left blocks and at least one block from the top blocks may be used to derive a sub-block unit inter candidate.

For example, the left neighboring blocks may be blocks at A, B, C, . . . , F, G in FIG. 12, and at least one block may be used to derive a sub-block unit inter prediction information by constructing a search order in the order of blocks at A, B, G or A, B in FIG. 12.

For example, the top neighboring blocks may be blocks at one or more positions of H, I, J, . . . , N, O in FIG. 12, and at least one block may be used to derive a sub-block unit inter prediction information by constructing a search order in the order of blocks at O, N, I, H or O, N, H in FIG. 12.

The search order of the bottom-left, top-right, and top-left neighboring blocks may be constructed in the same manner. By determining whether motion information is available, at least one block in the top-left blocks, at least one block in the top-right blocks, and at least one block in the bottom-left blocks may be used to derive a sub-block unit inter candidate.

For example, the bottom-left neighboring blocks may be blocks at A, . . . , D, and at least one block may be used to derive a sub-block unit inter prediction information by constructing a search order in the order of blocks at A, B, C, D or A, B, C or A, B in FIG. 12.

For example, the top-right neighboring blocks may be blocks at L, . . . , O, and at least one block may be used to derive a sub-block unit inter prediction information by constructing a search order in the order of blocks at O, N, M, L or O, N, M in FIG. 12.

For example, the top-left neighboring blocks may be blocks at F, G, . . . , I, J, and at least one block may be used to derive a sub-block unit inter prediction information by constructing a search order in the order of blocks at H, I, G, J, F or H, I, G blocks in FIG. 12.

When the inter prediction mode of the current block is determined as the MMVD mode, an MMVD candidate list may be constructed. The MMVD candidate list may consist of N inter prediction information.

The MMVD candidate list includes at least one of inter prediction information of a spatial neighboring block, inter prediction information of a temporal neighboring block, and HMVP.

MMVD candidates may consist of, for example, two or two or more lists.

For example, when deriving spatial motion information of a neighboring block, it may be derived in the order of blocks at B, J, K, A, F in FIG. 9.

For example, the position of the temporal neighboring block may correspond to a position a or b of a block existing in the previous picture in FIG. 10.

The current block may be predicted by combining the MMVD candidate, additional motion direction information, and additional motion size information.

For example, as shown in FIG. 13, additional motion direction information of top, bottom, left, and right may be signaled for a candidate motion vector.

For example, a size of [¼, ½, 1, 2, 4, 8, 16, 32] may be signaled in addition to the candidate motion vector.

When the inter prediction mode of the current block is determined as the MH intra mode, an MH intra candidate list may be constructed. The MH intra candidate list may consist of N inter prediction information.

The MH intra mode may be the same mode as a combined inter-intra prediction (CIIP) mode.

The MH intra candidate list includes at least one of inter prediction information of a spatial neighboring block, inter prediction information of a temporal neighboring block, and HMVP.

For example, the merge mode candidate list may be used as the MH intra candidate list.

When the inter prediction mode of the current block is determined as the triangular mode, a triangular candidate list may be constructed. The triangular candidate list may consist of N inter prediction information.

The triangular candidate list includes at least one of inter prediction information of a spatial neighboring block and inter prediction information of a temporal neighboring block.

By searching for neighboring blocks in a predetermined order, the candidate list using motion information in uni-direction may be constructed.

Figure 14:
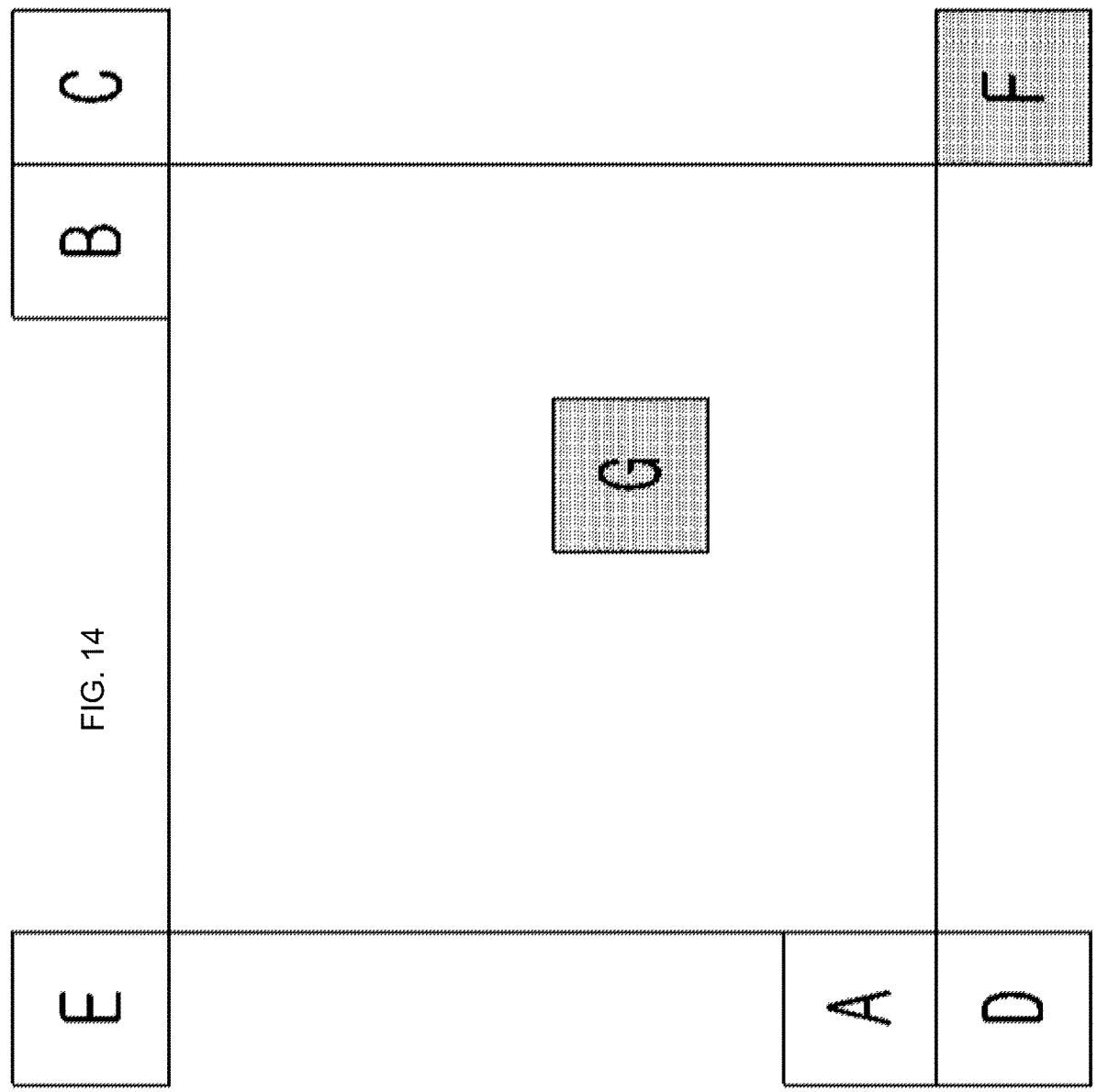

For example, as shown in FIG. 14, motion information of spatial neighboring blocks at a position {A, B, C, D, E} may be used as a candidate.

For example, as shown in FIG. 14, motion information of temporal neighboring blocks at a location {F, G} may be used as a candidate.

Motion information of the current block may be predicted by combining motion combinations of the constructed candidate list in a diagonal direction.

For example, as shown in FIG. 15, two or more motion information may be combined in a diagonal direction of 45 degrees.

For example, as shown in FIG. 15, two or more motion information may be combined in a diagonal direction of 135 degrees.

The inter prediction and motion compensation/modification step (S420); the inter prediction and motion compensation/modification may be performed by using at least one of motion compensation, brightness compensation (IC), OBMC (overlapped block motion compensation), BIO (bi-directional optical flow), affine spatial motion prediction and compensation, and motion vector refinement on the decoder in inter prediction for the current block.

Motion compensation may be performed in inter prediction and motion compensation/modification of the current block.

The above-described candidate list may include one or more inter prediction candidates, and any one of a plurality of inter prediction candidates may be selected. The selection may be performed based on a signaled flag or index. The inter prediction information of the selected inter prediction candidate may be set as inter prediction information of the current block. A prediction block for the current block is generated using the set inter prediction information (at least one of a motion vector, a reference picture list, and a reference picture index).

In motion compensation, uni-directional motion information compensation may be performed.

For example, the motion compensation may be performed with a block in one picture of one reference picture list L0.

For example, the motion compensation may be performed by combining two or more blocks in one picture of one reference picture list L0.

For example, the motion compensation may be performed by combining two or more blocks in two or more pictures of one reference picture list L0.

For example, the motion compensation may be performed with a block in one picture of one reference picture list L1.

For example, the motion compensation may be performed by combining two or more blocks in one picture of one reference picture list L1.

For example, the motion compensation may be performed by combining two or more blocks in two or more pictures of one reference picture list L1.

In motion compensation, bi-directional motion information compensation may be performed.

For example, the motion compensation may be performed by mixing one block of each of two reference picture lists L0 and L1.

For example, the motion compensation may be performed by combining two or more blocks of two reference picture lists L0 and L1, respectively.

For example, the motion compensation may be performed by combining two or more blocks in two or more pictures for two reference picture lists L0 and L1, respectively.

In inter prediction and motion compensation/modification of the current block, brightness compensation may be performed.

In the motion compensation, a change in brightness/illumination of a reference picture in which a block used for motion compensation exists and a reference picture in which a current block exists may be compensated.

For example, the brightness compensation may be performed by approximating a change of a neighboring sample of a current block and a neighboring sample of a reference block with a linear model of N or more arbitrary integers, and applying the linear model to a motion-compensated block. The linear model may be defined as at least one of a weight or an offset.

In inter prediction and motion compensation/modification of the current block, the overlapped block motion compensation (OBMC) may be performed.

A prediction block may be generated by combing a block compensated with inter prediction information of the current block and one or more blocks compensated with inter prediction information of at least one or more blocks among neighboring blocks of the current block in the current block.

For example, a prediction block may be generated by combining a left block and a right block based on the current block.

For example, a prediction block may be generated by combining a top block, a bottom block, a left block, and a right block based on the current block.

For example, a prediction block may be generated by combining one of neighboring blocks based on the current block.

Figure 16:
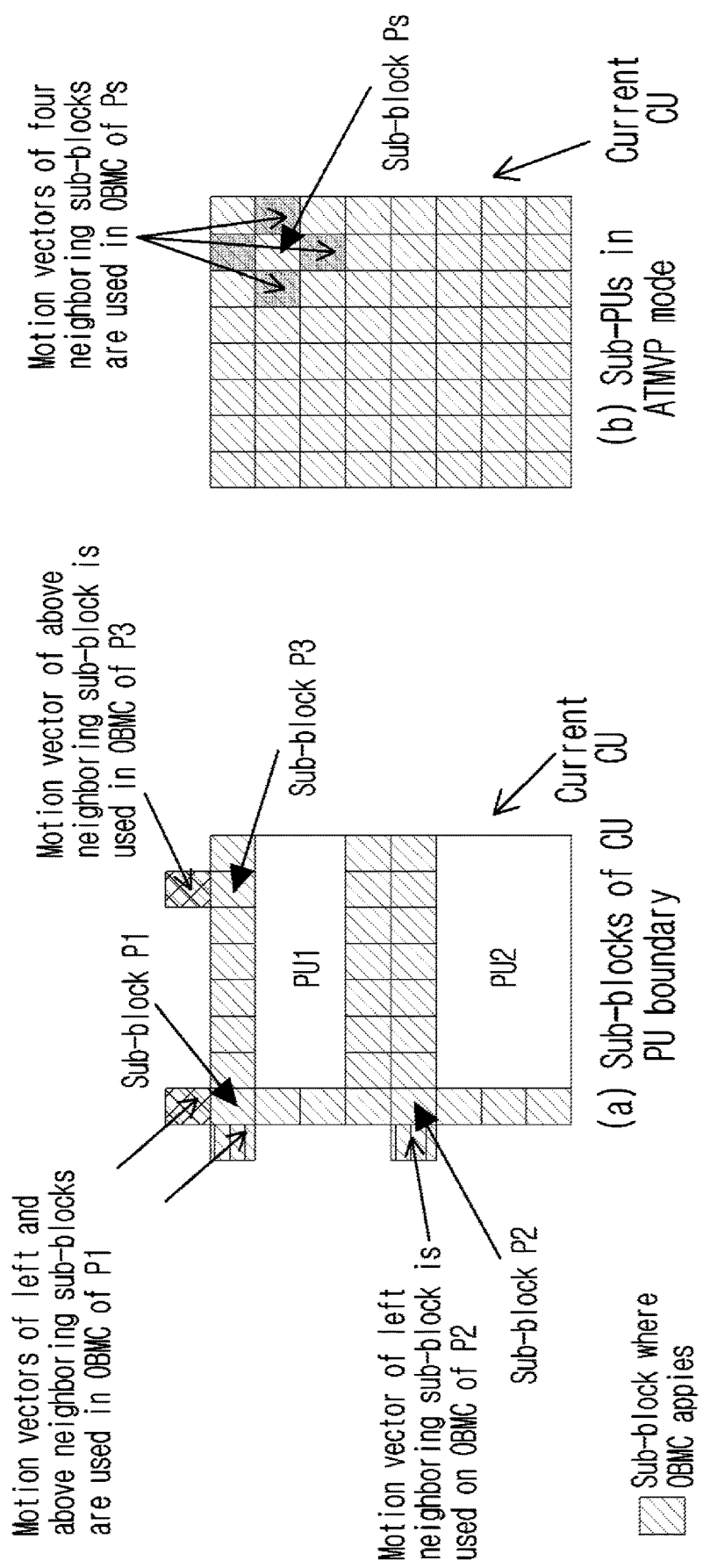

As shown in FIG. 16, a prediction block may be generated by combining a block compensated with sub-block unit inter prediction information of the current block and one or more blocks compensated with inter prediction information of at least one or more blocks among sub-blocks at the left, right, top, and bottom of a corresponding sub-block in the current block.

For example, it may be performed on only sub-blocks located on a boundary position in the current block.

For example, it may be performed on all sub-blocks in the current block.

For example, it may be performed on only sub-blocks located on a left boundary position in the current block.

For example, it may be performed on only sub-blocks located on a right boundary position in the current block. For example, it may be performed on only sub-blocks located on the boundary position of at least one of the top or bottom of the current block.

Bi-directional optical flow (BIO) may be performed for inter prediction and motion compensation/modification of the current block.

The motion vector of the current block may be obtained through the optical flow of the block in a uni-directional position.

The motion vector of the current block may be obtained through a bi-directional optical flow using a block existing in a previous picture and in a subsequent picture of the current picture in display order.

Blocks existing in the previous picture and the subsequent picture may be blocks similar to the current picture having opposite motions.

In case of the MH intra mode, a prediction block motion-compensated with inter prediction information of a candidate in an MH intra candidate list (hereinafter, a first prediction block) may be modified using an intra prediction mode. Specifically, a modified prediction block (hereinafter, a third prediction block) may be generated by modifying the first prediction block using a prediction block (hereinafter, referred to as a second prediction block) generated in the intra prediction mode.

The MH intra mode may be the same mode as the combined inter-intra Prediction (CIIP) mode.

The intra prediction mode may be derived based on an MPM candidate as described above, or may be an intra prediction mode pre-defined in an encoding/decoding apparatus. Here, the pre-defined intra prediction mode may be a directional or non-directional mode. For example, in the encoding/decoding apparatus, the intra prediction mode may be fixed to one of a planar mode, a DC mode, a vertical mode, or a horizontal mode.

For example, in the case of the MH intra mode, the intra prediction mode of the current block may be set to the planar mode, and the first prediction block may be modified using the second prediction block generated using the planar mode. However, the present disclosure is not limited thereto, and an intra prediction mode having an average value of neighboring reference pixels may be used, or an intra prediction mode having a horizontal mode or a vertical mode may be used.

Generating the third prediction block by modifying the first prediction block using the second prediction block may be performed by multiplying each sample of the first prediction block and the second prediction block by a weight. For example, it may be performed by Equation 2 below.

$$CU\_PredSamp[x][y]=(w*1st\_Predsamp[x][y]+(4-w)*2nd\_Predsamp[x][y]+\text{offset})>>2 \quad \text{[Equation 2]}$$

Here, CU_PredSamp denotes a sample of the modified prediction block (the third prediction block) of the current block, 1st_Predsamp denotes a sample of the first prediction block, 2rd_Predsamp denotes a sample of the second prediction block, offset denotes an offset, w denotes a weight, and x, y denote the x-coordinate and y-coordinate of a cartesian coordinate system, where x may represent from 0 to cbWidth (a width of the current block)−1, and y may represent from 0 to cbHeight (a height of the current block)−1.

The weight may be a pre-promised fixed value or a value variably determined through the above-described coding parameter. Specifically, the weight may be performed in consideration of availability and a prediction mode of a neighboring block. The neighboring block may mean at least one of a top block or a left block. When a plurality of blocks exist at the top of the current block, the right-most block or the left-most block may be used as the top block. When a plurality of blocks exist at the left of the current block, the bottom-most block or top-most block may be used as the left block.

For example, when prediction modes of neighboring blocks are an intra prediction mode and availability of the neighboring blocks is all recognized, the weight w may be set to 1. When all of the prediction modes of the neighboring blocks are not the intra prediction mode, the weight may be set to 3. When the availability of the neighboring blocks is not recognized, the weight may be set to 2.

The offset may have a natural number of 0, 1, 2, 3 or more. This may be a pre-promised fixed value or may be variably determined by the above-described coding parameter. For example, the offset may be fixed to 2.

The modification according to the MH intra mode may be selectively performed based on the above-described MH intra flag. The MH intra_flag may have a value of 0, 1, or more.

Specifically, when the MH intra_flag is a first value (e.g., 1), it specifies that the MH intra mode is used, but when the MH intra_flag is a second value (e.g., 0), it specifies that the MH intra mode is not used.

The MH intra flag may be encoded and signaled by an encoding apparatus based on at least one of a slice type, whether a skip mode is used, and a width and a height of a current block.

For example, the MH intra flag may be signaled only when the slice type is B slice. For example, the MH intra flag may be signaled only when the skip mode is not applied. For example, the MH intra flag may be signaled only when the width and height of the current block are less than a predetermined first threshold value, respectively. Here, the first threshold value may be an integer of 64, 128 or more. For example, the MH intra flag may be signaled only when a product of the width and height of the current block is equal to or greater than a second predetermined threshold value. Here, the second threshold value may be an integer of 32, 64, 128 or more. However, the second threshold value may be set less than the first threshold value.

In addition, the MH intra flag may be signaled only when a condition obtained by combining at least two of the above examples is satisfied. For example, the MH intra flag may be signaled only when the slice type is B slice, the skip mode is not applied, the product of the width and height of the current block is 64 or more, and the width and height of the current block are each than 128, respectively.

When the MH intra flag is not signaled, the MH intra flag value may have a predetermined fixed value (e.g., 0 or 1) or may have a variable value based on the inter prediction mode, the size of the current block, etc. For example, when the inter prediction mode is a sub-block unit prediction mode, the MH intra flag may be set to a second value (e.g., 0).

Specifically, the MH intra flag may be set to a first value (e.g., 1), when at least one condition among the cases where the merge mode is applied, where the sub-block unit prediction mode is not applied, where the skip mode is not applied, where the width and height of the current block are less than 128, or where the product of the width and height of the current block is 64 or more, is satisfied.

Hereinafter, in the case of the MH intra mode, a method of generating the second prediction block of the current block based on intra prediction will be described.

The intra prediction may be generated by constructing a reference sample to be used for prediction of the current block, and generating an intra prediction sample using the constructed reference sample.

The constructing the reference sample may include constructing the reference sample using the above-described neighboring block of the current block to be encoded/decoded. Here, using the neighboring block may include using all or part of the samples in the neighboring block, or using an average value, a weighted average value, a representative value, a most frequent value, a minimum value, a maximum value, etc. of the samples in the neighboring block. For example, the reference sample may be constructed using all samples in a neighboring block that are spatially adjacent to at least one of the left or top part of a target block.

The constructing the reference sample may include at least one of determining whether the reference sample is available, replacing the reference sample, or filtering the reference sample.

The determining whether the reference sample is available may include determining whether the constructed reference sample is available. For example, when a block including the reference sample is not encoded or decoded, or when the reference sample exists out of a boundary of a picture, slice, tile, entropy slice, wavefront (WPP, wavefront parallel processing), etc., the reference sample may be determined to be unavailable. Alternatively, when a block including the reference sample is an inter mode coded block under an environment in which constrained intra prediction (CIP) is used, the reference sample may be determined to be unavailable.

The replacing the reference sample may include replacing the reference sample according to a result of determining whether the reference sample is available. Specifically, it may include replacing a sample value whose availability is not recognized among the constructed reference sample with the other sample value.

The other sample value may be any one of samples in which availability is recognized among the constructed reference sample. In addition, this may include a pre-promised fixed value, a value variably determined by the above-described coding parameter (e.g., a value variably determined by a bit depth). Here, any one of samples in which the availability is recognized may be adjacent to the top, bottom, left, or right of samples in which the availability is not recognized.

The filtering of the reference sample may be a step of filtering the constructed reference pixel to increase prediction efficiency. The filtering may be performed on a filtering target sample using at least one of the filtering target sample or neighboring sample of the filtering target sample. The filtering may be performed by an average value, a weighted average value, a most frequent value, a maximum value, a minimum value, or a representative value of the samples, or may be performed by an n-tap filter. Here, n may include a natural number of 1, 2, 3, 4, or more, and may be a pre-promised fixed value or a value variably determined by the above-described coding parameter. For example, the filtering may be a 3-tap filter having [¼, 2/4, ¼].

Also, whether to perform the filtering step may be determined by a flag. The flag may be determined according to an intra prediction mode. For example, when the intra prediction mode is a planar mode, the filtering may be applied. Alternatively, whether filtering is applied to a reference sample according to an intra prediction mode of a prediction target block may be tabled and determined in advance.

Alternatively, when filtering is applied to reference samples, whether to apply filtering to the reference samples may be determined according to a color component of the prediction target block. For example, if the color component is a luma signal, filtering may be applied to the reference samples, and if the color component is a chroma signal, filtering may not be applied to the reference samples.

The generating the intra prediction sample may be a step of generating the intra prediction sample using the constructed reference sample. The method of generating the prediction sample may vary according to the intra prediction mode. Here, as described above, the intra prediction mode may be classified into a non-directional prediction mode and a directional prediction mode.

The non-directional prediction mode may include a DC mode and a planar mode. In the DC mode, one fixed value may be used as a prediction value of samples in the prediction target block. For example, in the DC mode, one fixed value may be derived by an average of sample values located around the prediction target block. In the planar mode, vertical interpolation and horizontal interpolation may be performed using samples vertically adjacent to the prediction target block and samples horizontally adjacent to the prediction target block, and an average value thereof may be used as a prediction value of samples in the prediction target block.

The directional prediction mode is a mode indicating a direction in which a reference sample is located, and may indicate a corresponding direction as an angle between a prediction target sample in a prediction target block and a reference sample. The directional prediction mode may be called an angular mode, and may include a vertical mode, a horizontal mode, etc. The vertical mode may use a sample value adjacent to the prediction target block in the vertical direction as a prediction value of a sample in the prediction target block, and the horizontal mode may use a sample value adjacent to the prediction target block in the horizontal direction as a prediction value of a sample in the prediction target block. In addition, angular modes other than the vertical mode and the horizontal mode may derive a prediction value of a sample in the prediction target block by using a reference sample located at a predetermined angle and/or direction for each mode.

When the intra prediction mode of the current block is the planar mode, a prediction value of a prediction target sample of the current block may be derived by using at least one of a first reference sample variably determined according to a position of the prediction target sample and a second reference sample fixed regardless of the position of the prediction target sample. Here, the first reference sample is a reference sample located on the same horizontal line as the prediction target sample (i.e., a reference sample having the same x-coordinate value as the prediction target sample) or a reference sample located on the same vertical line as the prediction target sample (i.e., a reference sample having the same y-coordinate value as the prediction target sample). The second reference sample may include at least one of a sample adjacent to a top-right corner of the current block among a plurality of neighboring samples adjacent to a top boundary of the current block, a sample adjacent to a bottom-left corner of the current block among a plurality of neighboring samples adjacent to a left boundary of the current block, or a neighboring sample adjacent to a top-left corner of the current block.

In addition, in the case of the planar mode, a prediction sample may be generated through Equation 3.

$$predV[x][y]=((nTbH-1-y)*p[x][-1]+(y+1)*p[-1][nTbH])<<Log\ 2(nTbW)$$

$$predH[x][y]=((nTbW-1-x)*p[-1][y]+(x+1)*p[nTbW][-1])<<Log\ 2(nTbH)$$

$$predSamples[x][y]=(predV[x][y]+predH[x][y]+nTbW*nTbH)>>Log\ 2(nTbW)+Log\ 2(nTbH)+1) \quad [\text{Equation 3}]$$

Here, p[x][y] denotes the reference sample, predSamples [x][y] denotes the prediction sample, nTbW and nTbH denote a width and height of a transform block, respectively, and x may represent the x coordinate from 0 to nTbW−1, y may represent the y coordinate from 0 to nTbH−1.

Specifically, PredV may be obtained by multiplying a first reference sample variably determined according to a position of x and a second reference sample adjacent to a bottom-left corner of the current block determined regardless of the position of x by a weight, and PredH may be obtained by multiplying a first reference sample variably determined according to a position of y and a second reference sample adjacent to a top-right corner of the current block determined regardless of the position of y by a weight. The predicted samples (predSamples[x] [y]) may be derived through a weighted average of PredV and PredH. In this case, a weight for the weighted average may be expressed as [1:k] or [k:1]. The absolute value of k may be 0, 1, 2, 3, 4 or more, and k may be positive or negative.

An affine spatial motion prediction and compensation may be performed for inter prediction and motion compensation/modification of the current block.

A motion vector for each pixel of the current block may be generated by using an affine transform equation and the motion vector at the top-left and top-right of the current block, and motion compensation may be performed by using the motion vector.

A motion vector in units of sub-blocks of the current block may be generated by using an affine transform equation and the motion vector at the top-left and top-right of the current block, and motion compensation may be performed by using the motion vector.

The motion vectors at the top-left and top-right of the current block may be transmitted.

The motion vectors at the top-left and top-right of the current block may be transmitted only with the difference between neighboring motion vectors of the corresponding vectors.

The motion vectors at the top-left and top-right of the current block may be derived without transmission by using an affine motion vector of a current neighboring block.

The affine spatial motion compensation may be performed by adaptively using the motion vectors of not only the top-left and top-right, but also the bottom-left.

The affine spatial motion compensation may be performed by adaptively using the motion vectors of the top-left, the top-right and the bottom-left of the current block.

In the inter prediction and motion compensation/modification of the current block, motion vector modification on the decoder may be performed.

The motion vector of the current block may be modified in the current block by using the motion vector transmitted to the decoder.

For example, as shown in FIG. 17, the motion vector of the current block may be refined using the best matching block by searching neighboring blocks indicated by the obtained MV0 and MV1.

In performing inter prediction information modification for bilateral matching, the SAD may be used to derive block matching.

For example, it may indicate that the two blocks having the lowest SAD or MR-SAD are best matched.

INDUSTRIAL AVAILABILITY

Embodiments of the present disclosure as described above may be used in an apparatus or method of decoding/encoding a video or image.

The invention claimed is:

1. A method of decoding an image, comprising:
determining at least one of a plurality of inter prediction modes as an inter prediction mode of a current block in the image;
constructing a first candidate list of the current block based on the determined inter prediction mode;
generating a first prediction block of the current block by performing inter prediction on one of a plurality of merge candidates included in the first candidate list;
generating a second prediction block of the current block based on only a pre-defined intra prediction mode in a decoding apparatus, the pre-defined intra prediction mode being representative of a Planar mode; and
generating a final prediction block of the current block by combining the first prediction block and the second prediction block,
wherein the final prediction block is generated by a weighted sum of the first prediction block and the second prediction block,
wherein a weight applied to the second prediction block for the weighted sum is determined based on a prediction mode of a neighboring block of the current block,
wherein the first candidate list further includes a merge candidate having motion information of a previously decoded block and a combined merge candidate,
wherein the motion information of the previously decoded block is derived from a second candidate list,
wherein the second candidate list is constructed based on motion information of N previously decoded blocks, and
wherein the combined merge candidate is derived based on an average of motion vectors of at least two merge candidates belonging to the first candidate list.

2. The method of claim 1, wherein the first candidate list includes at least one of a spatial merge candidate or a temporal merge candidate.

3. The method of claim 1, wherein the combination of the first prediction block and the second prediction block is selectively performed according to a flag indicating whether to perform the combination.

4. The method of claim 3, wherein the flag is adaptively signaled or derived based on at least one of a type of a slice to which the current block belongs or an inter prediction mode of the current block.

5. The method of claim 1, wherein N is less than or equal to 5.

6. The method of claim 1, wherein the neighboring block includes at least one of a top neighboring block or a left neighboring block, and
wherein, in response to a case where a plurality of blocks exists at a top of the current block, a right-most block among the plurality of blocks is used as the top neighboring block.

7. The method of claim 6, wherein, in response to a case where all of prediction modes of the top neighboring block and the left neighboring block are not an intra mode, the weight is determined as 3.

8. A method of encoding an image, comprising:
determining at least one of a plurality of inter prediction modes as an inter prediction mode of a current block in the image;
constructing a first candidate list of the current block in response to the determined inter prediction mode;
generating a first prediction block of the current block by performing inter prediction based on one of a plurality of merge candidates included in the first candidate list;
generating a second prediction block of the current block based on only a pre-defined intra prediction mode in an encoding apparatus, the pre-defined intra prediction mode being representative of a Planar mode; and
generating a final prediction block of the current block by combining the first prediction block and the second prediction block,
wherein the final prediction block is generated by a weighted sum of the first prediction block and the second prediction block,
wherein a weight applied to the second prediction block for the weighted sum is determined based on a prediction mode of a neighboring block of the current block,
wherein the first candidate list further includes a merge candidate having motion information of a previously decoded block and a combined merge candidate,
wherein the motion information of the previously decoded block is derived from a second candidate list,
wherein the second candidate list is constructed based on motion information of N previously decoded blocks, and
wherein the combined merge candidate is derived based on an average of motion vectors of at least two merge candidates belonging to the first candidate list.

9. A non-transitory computer-readable storage medium for storing a bitstream generated by an image encoding method, the image encoding method comprising:
determining at least one of a plurality of inter prediction modes as an inter prediction mode of a current block in the image;
constructing a first candidate list of the current block in response to the determined inter prediction mode;
generating a first prediction block of the current block by performing inter prediction based on one of a plurality of merge candidates included in the first candidate list;
generating a second prediction block of the current block based on only a pre-defined intra prediction mode in an encoding apparatus, the pre-defined intra prediction mode being representative of a Planar mode; and
generating a final prediction block of the current block by combining the first prediction block and the second prediction block,
wherein the final prediction block is generated by a weighted sum of the first prediction block and the second prediction block,
wherein a weight applied to the second prediction block for the weighted sum is determined based on a prediction mode of a neighboring block of the current block,
wherein the first candidate list further includes a merge candidate having motion information of a previously decoded block and a combined merge candidate,
wherein the motion information of the previously decoded block is derived from a second candidate list,
wherein the second candidate list is constructed based on motion information of N previously decoded blocks, and
wherein the combined merge candidate is derived based on an average of motion vectors of at least two merge candidates belonging to the first candidate list.

* * * * *

UNITED STATES PATENT AND TRADEMARK OFFICE
CERTIFICATE OF CORRECTION

PATENT NO. : 11,792,393 B2
APPLICATION NO. : 17/418643
DATED : October 17, 2023
INVENTOR(S) : Jae Gon Kim et al.

It is certified that error appears in the above-identified patent and that said Letters Patent is hereby corrected as shown below:

In the Claims

- In Column 36, Line 21, Column 36, Line 22, and Column 36, Line 25, of Claim 8, the word "decoded" should be changed to "encoded."

- In Column 36, Line 56, Column 36, Line 57, and Column 36, Line 60 of Claim 9, the word "decoded" should be changed to "encoded."

Signed and Sealed this
Third Day of December, 2024

Katherine Kelly Vidal
*Director of the United States Patent and Trademark Office*